United States Patent
Roth et al.

(10) Patent No.: US 11,323,479 B2
(45) Date of Patent: May 3, 2022

(54) DATA LOSS PREVENTION TECHNIQUES

(71) Applicant: Amazon Technologies, Inc., Seattle, WA (US)

(72) Inventors: Gregory Branchek Roth, Seattle, WA (US); Eric Jason Brandwine, Haymarket, VA (US); Matthew James Wren, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/046,582

(22) Filed: Jul. 26, 2018

(65) Prior Publication Data

US 2018/0359282 A1    Dec. 13, 2018

Related U.S. Application Data

(62) Division of application No. 13/932,872, filed on Jul. 1, 2013, now Pat. No. 10,075,471.

(51) Int. Cl.
*H04L 29/06* (2006.01)
*H04L 9/32* (2006.01)

(52) U.S. Cl.
CPC .......... *H04L 63/20* (2013.01); *H04L 63/0471* (2013.01); *H04L 63/06* (2013.01)

(58) Field of Classification Search
CPC ...... H04L 63/0471; H04L 63/06; H04L 63/20
See application file for complete search history.

(56) References Cited

U.S. PATENT DOCUMENTS

| | | |
|---|---|---|
| 4,782,517 A | 11/1988 | Bernardis et al. |
| 4,868,877 A | 9/1989 | Fischer |
| 4,908,759 A | 3/1990 | Alexander et al. |
| 4,918,728 A | 4/1990 | Matyas et al. |
| 5,054,067 A | 10/1991 | Moroney et al. |
| 5,146,498 A | 9/1992 | Smith |
| 5,201,000 A | 4/1993 | Matyas et al. |
| 5,495,533 A | 2/1996 | Linehan et al. |
| 5,633,931 A | 5/1997 | Wright |
| 5,675,653 A | 10/1997 | Nelson |
| 5,826,245 A | 10/1998 | Sandberg-Diment |
| 5,862,220 A | 1/1999 | Perlman |

(Continued)

FOREIGN PATENT DOCUMENTS

| | | |
|---|---|---|
| CN | 1740944 | 3/2006 |
| CN | 1787431 | 6/2006 |

(Continued)

OTHER PUBLICATIONS

Australian Examination Report No. 1 for Patent Application No. 2017204853 dated Jun. 29, 2018, 4 pages.

(Continued)

*Primary Examiner* — Gary S Gracia
(74) *Attorney, Agent, or Firm* — Davis Wright Tremaine LLP

(57) ABSTRACT

A system comprises a data storage service includes a web service interface operating as a proxy to the data storage service. Data obtained at the data storage service is analyzed by one or more criteria of a data loss prevention policy, the data is encrypted by a key that is inaccessible to a remote service, and then the encrypted data is transmitted to the remote service.

14 Claims, 15 Drawing Sheets

(56) References Cited

U.S. PATENT DOCUMENTS

| | | |
|---|---|---|
| 5,870,477 A | 2/1999 | Sasaki et al. |
| 5,933,503 A | 8/1999 | Schell et al. |
| 6,012,144 A | 1/2000 | Pickett |
| 6,175,625 B1 | 1/2001 | Safford et al. |
| 6,185,679 B1 | 2/2001 | Coppersmith et al. |
| 6,195,622 B1 | 2/2001 | Altschuler et al. |
| 6,199,162 B1 | 3/2001 | Luyster |
| 6,240,187 B1 | 5/2001 | Lewis |
| 6,259,789 B1 | 7/2001 | Paone |
| 6,336,186 B1 | 1/2002 | Dyksterhouse et al. |
| 6,356,941 B1 | 3/2002 | Cohen |
| 6,505,299 B1 | 1/2003 | Zeng et al. |
| 6,546,492 B1 | 4/2003 | Walker et al. |
| 6,816,595 B1 | 11/2004 | Kudo |
| 6,934,249 B1 | 8/2005 | Bertin et al. |
| 6,934,702 B2 | 8/2005 | Faybishenko et al. |
| 7,149,698 B2 | 12/2006 | Guheen et al. |
| 7,194,424 B2 | 3/2007 | Greer et al. |
| 7,295,671 B2 | 11/2007 | Snell |
| 7,362,868 B2 | 4/2008 | Madoukh et al. |
| 7,400,733 B1 | 7/2008 | Cam-Winget et al. |
| 7,490,248 B1 | 2/2009 | Valfridsson et al. |
| 7,565,419 B1 | 7/2009 | Kwiatkowski et al. |
| 7,620,680 B1 | 11/2009 | Lamport |
| 7,680,905 B1 | 3/2010 | Roberts et al. |
| 7,707,288 B2 | 4/2010 | Dawson et al. |
| 7,716,240 B2 | 5/2010 | Lim |
| 7,756,808 B2 | 7/2010 | Weigt et al. |
| 7,774,826 B1 | 8/2010 | Romanek et al. |
| 7,865,446 B2 | 1/2011 | Armingaud et al. |
| 7,877,607 B2 | 1/2011 | Circenis et al. |
| 7,882,247 B2 | 2/2011 | Sturniolo et al. |
| 7,894,604 B2 | 2/2011 | Nishioka et al. |
| 7,894,626 B2 | 2/2011 | Wang et al. |
| 7,937,432 B2 | 5/2011 | Rowley |
| 7,953,978 B2 | 5/2011 | Greco et al. |
| 7,970,625 B2 | 6/2011 | Reicher et al. |
| 7,991,747 B1 | 8/2011 | Upadhyay et al. |
| 7,992,055 B1 | 8/2011 | Agarwal et al. |
| 8,024,562 B2 | 9/2011 | Gentry et al. |
| 8,024,582 B2 | 9/2011 | Kunitz et al. |
| 8,051,187 B2 | 11/2011 | Noy et al. |
| 8,060,596 B1 | 11/2011 | Wootton et al. |
| 8,065,720 B1 | 11/2011 | Ebrahimi et al. |
| 8,091,125 B1 | 1/2012 | Hughes et al. |
| 8,111,828 B2 | 2/2012 | Raman et al. |
| 8,131,663 B1 | 3/2012 | Taylor |
| 8,140,679 B2 | 3/2012 | Hatanaka |
| 8,140,847 B1 | 3/2012 | Wu |
| 8,185,931 B1 | 5/2012 | Reeves |
| 8,213,602 B2 | 7/2012 | Mamidwar |
| 8,218,770 B2 * | 7/2012 | Arulambalam ......... G06F 21/72 |
| | | 380/277 |
| 8,219,869 B2 | 7/2012 | Ahn et al. |
| 8,224,796 B1 | 7/2012 | Shinde et al. |
| 8,224,979 B2 | 7/2012 | Herz et al. |
| 8,230,050 B1 | 7/2012 | Brandwine et al. |
| 8,244,745 B2 | 8/2012 | Lim |
| 8,245,037 B1 | 8/2012 | Durgin et al. |
| 8,245,039 B2 | 8/2012 | Jones |
| 8,251,283 B1 | 8/2012 | Norton |
| 8,261,320 B1 | 9/2012 | Serenyi et al. |
| 8,295,492 B2 | 10/2012 | Suarez et al. |
| 8,296,434 B1 | 10/2012 | Miller et al. |
| 8,302,170 B2 | 10/2012 | Kramer et al. |
| 8,312,064 B1 | 11/2012 | Gauvin |
| 8,315,387 B2 | 11/2012 | Kanter et al. |
| 8,321,560 B1 * | 11/2012 | Pai ...................... G06F 11/0793 |
| | | 709/224 |
| 8,370,648 B1 | 2/2013 | Natanzon |
| 8,379,857 B1 | 2/2013 | Zheng |
| 8,387,127 B1 | 2/2013 | Narver et al. |
| 8,443,367 B1 | 5/2013 | Taylor et al. |
| 8,468,455 B2 | 6/2013 | Jorgensen et al. |
| 8,494,168 B1 | 7/2013 | Tolfmans |
| 8,538,020 B1 * | 9/2013 | Miller ................... H04L 9/0825 |
| | | 380/259 |
| 8,555,383 B1 | 10/2013 | Marshall et al. |
| 8,565,108 B1 | 10/2013 | Marshall et al. |
| 8,572,369 B2 | 10/2013 | Schmidt-Karaca et al. |
| 8,572,758 B1 * | 10/2013 | Clifford ............. G06F 21/6218 |
| | | 726/30 |
| 8,588,426 B2 | 11/2013 | Xin et al. |
| 8,601,263 B1 * | 12/2013 | Shankar .............. H04L 63/0428 |
| | | 713/166 |
| 8,607,358 B1 | 12/2013 | Shankar et al. |
| 8,654,970 B2 | 2/2014 | Olson et al. |
| 8,681,773 B2 | 3/2014 | Chazel et al. |
| 8,713,311 B1 | 4/2014 | Roskind |
| 8,751,807 B2 | 6/2014 | Ma et al. |
| 8,752,067 B2 | 6/2014 | Kishita |
| 8,774,403 B2 | 7/2014 | MacMillan et al. |
| 8,804,950 B1 | 8/2014 | Panwar |
| 8,850,516 B1 * | 9/2014 | Hrebicek ............ G06F 16/1734 |
| | | 726/1 |
| 8,868,914 B2 | 10/2014 | Teppler |
| 8,904,181 B1 | 12/2014 | Felsher et al. |
| 8,950,005 B1 | 2/2015 | Torney |
| 8,964,990 B1 | 2/2015 | Baer et al. |
| 8,971,539 B2 * | 3/2015 | Pandrangi ............ H04L 9/0894 |
| | | 380/286 |
| 8,973,008 B2 | 3/2015 | Czajkowski et al. |
| 8,989,379 B2 | 3/2015 | Katar et al. |
| 9,031,240 B2 | 5/2015 | Yang et al. |
| 9,053,460 B2 | 6/2015 | Gilbert et al. |
| 9,094,291 B1 * | 7/2015 | Jackson .............. G06F 21/6245 |
| 9,130,937 B1 | 9/2015 | Ostermann et al. |
| 9,268,947 B1 | 2/2016 | Jarlstrom et al. |
| 9,288,184 B1 | 3/2016 | Kvamme et al. |
| 9,306,741 B1 | 4/2016 | Brainard |
| 9,367,697 B1 | 6/2016 | Roth et al. |
| 9,705,674 B2 | 7/2017 | Roth et al. |
| 2001/0011226 A1 | 8/2001 | Greer et al. |
| 2001/0052071 A1 | 12/2001 | Kudo et al. |
| 2002/0029337 A1 | 3/2002 | Sudia et al. |
| 2002/0076044 A1 | 6/2002 | Pires |
| 2002/0078361 A1 * | 6/2002 | Giroux ................ H04L 63/0428 |
| | | 713/183 |
| 2002/0135611 A1 | 9/2002 | Deosaran et al. |
| 2002/0141590 A1 | 10/2002 | Montgomery |
| 2003/0021417 A1 | 1/2003 | Vasic et al. |
| 2003/0037237 A1 | 2/2003 | Abgrall et al. |
| 2003/0079120 A1 * | 4/2003 | Hearn ..................... G06F 21/10 |
| | | 713/150 |
| 2003/0081790 A1 | 5/2003 | Kallahalla et al. |
| 2003/0084290 A1 | 5/2003 | Murty et al. |
| 2003/0093694 A1 | 5/2003 | Medvinsky et al. |
| 2003/0110376 A1 | 6/2003 | Wiener et al. |
| 2003/0131238 A1 | 7/2003 | Vincent |
| 2003/0163701 A1 | 8/2003 | Ochi et al. |
| 2003/0172269 A1 | 9/2003 | Newcombe |
| 2003/0188181 A1 | 10/2003 | Kunitz et al. |
| 2003/0188188 A1 | 10/2003 | Padmanabhan et al. |
| 2003/0195957 A1 | 10/2003 | Banginwar |
| 2003/0219129 A1 | 11/2003 | Whelan et al. |
| 2004/0009815 A1 | 1/2004 | Zotto et al. |
| 2004/0093499 A1 | 5/2004 | Arditi et al. |
| 2004/0107345 A1 | 6/2004 | Brandt et al. |
| 2004/0143733 A1 | 7/2004 | Ophir et al. |
| 2004/0193915 A1 | 9/2004 | Smith et al. |
| 2004/0215987 A1 | 10/2004 | Farkas et al. |
| 2004/0223608 A1 | 11/2004 | Oommen et al. |
| 2005/0004978 A1 | 1/2005 | Reed et al. |
| 2005/0010760 A1 | 1/2005 | Goh et al. |
| 2005/0018842 A1 | 1/2005 | Fu et al. |
| 2005/0021712 A1 | 1/2005 | Chassapis et al. |
| 2005/0050317 A1 | 3/2005 | Kramer et al. |
| 2005/0120232 A1 | 6/2005 | Hori et al. |
| 2005/0123142 A1 | 6/2005 | Freeman et al. |
| 2005/0149677 A1 | 7/2005 | Shimada et al. |
| 2005/0165859 A1 | 7/2005 | Geyer et al. |
| 2005/0195743 A1 | 9/2005 | Rochberger et al. |
| 2005/0246778 A1 | 11/2005 | Usov et al. |
| 2005/0273629 A1 | 12/2005 | Abrams et al. |

(56) References Cited

U.S. PATENT DOCUMENTS

| | | |
|---|---|---|
| 2006/0010323 A1 | 1/2006 | Martin et al. |
| 2006/0018468 A1 | 1/2006 | Toba et al. |
| 2006/0021018 A1 | 1/2006 | Hinton et al. |
| 2006/0031301 A1 | 2/2006 | Herz et al. |
| 2006/0031586 A1 | 2/2006 | Sethi et al. |
| 2006/0089163 A1 | 4/2006 | Khawand et al. |
| 2006/0123010 A1 | 6/2006 | Landry et al. |
| 2006/0143685 A1 | 6/2006 | Vasishth et al. |
| 2006/0155829 A1 | 7/2006 | Annie |
| 2006/0168248 A1 | 7/2006 | Sack |
| 2006/0190724 A1* | 8/2006 | Adams ............... G06F 21/71 713/166 |
| 2006/0195575 A1 | 8/2006 | Delany et al. |
| 2006/0204003 A1 | 9/2006 | Takata et al. |
| 2006/0206932 A1 | 9/2006 | Chong |
| 2006/0288232 A1 | 12/2006 | Ho et al. |
| 2006/0291664 A1 | 12/2006 | Suarez et al. |
| 2007/0033637 A1 | 2/2007 | Yami et al. |
| 2007/0050641 A1 | 3/2007 | Flynn et al. |
| 2007/0055862 A1* | 3/2007 | Sharma ............... H04L 69/18 713/150 |
| 2007/0055921 A1 | 3/2007 | Challenor |
| 2007/0058814 A1* | 3/2007 | Robinson ............ H04L 9/0872 380/280 |
| 2007/0136599 A1 | 6/2007 | Suga |
| 2007/0140480 A1 | 6/2007 | Yao |
| 2007/0143851 A1 | 6/2007 | Nicodemus et al. |
| 2007/0150480 A1 | 6/2007 | Hwang et al. |
| 2007/0157288 A1 | 7/2007 | Lim |
| 2007/0179987 A1 | 8/2007 | Lim |
| 2007/0180153 A1 | 8/2007 | Cornwell et al. |
| 2007/0198656 A1 | 8/2007 | Mazzaferri et al. |
| 2007/0220279 A1 | 9/2007 | Northcutt et al. |
| 2007/0230704 A1 | 10/2007 | Youn et al. |
| 2007/0230706 A1 | 10/2007 | Youn |
| 2007/0239987 A1 | 10/2007 | Hoole et al. |
| 2007/0266037 A1 | 11/2007 | Terry et al. |
| 2007/0283446 A1 | 12/2007 | Yami et al. |
| 2008/0005024 A1 | 1/2008 | Kirkwood |
| 2008/0016337 A1 | 1/2008 | Morgan et al. |
| 2008/0019516 A1 | 1/2008 | Fransdonk |
| 2008/0019527 A1 | 1/2008 | Youn et al. |
| 2008/0022376 A1 | 1/2008 | Ke et al. |
| 2008/0025514 A1 | 1/2008 | Coombs |
| 2008/0034200 A1 | 2/2008 | Polcha et al. |
| 2008/0046984 A1 | 2/2008 | Bohmer et al. |
| 2008/0072066 A1* | 3/2008 | Vogler ............... G06F 21/31 713/187 |
| 2008/0082827 A1 | 4/2008 | Agrawal et al. |
| 2008/0084996 A1 | 4/2008 | Chen et al. |
| 2008/0086717 A1 | 4/2008 | Brunn et al. |
| 2008/0112561 A1 | 5/2008 | Kim |
| 2008/0127279 A1 | 5/2008 | Futa et al. |
| 2008/0172562 A1 | 7/2008 | Cachin et al. |
| 2008/0183656 A1 | 7/2008 | Perng et al. |
| 2008/0247540 A1 | 10/2008 | Ahn et al. |
| 2008/0294711 A1* | 11/2008 | Barber ............ H04L 29/12066 709/201 |
| 2008/0298590 A1 | 12/2008 | Katar et al. |
| 2008/0319909 A1 | 12/2008 | Perkins et al. |
| 2009/0025087 A1 | 1/2009 | Peirson, Jr. et al. |
| 2009/0034733 A1 | 2/2009 | Raman et al. |
| 2009/0060197 A1 | 3/2009 | Taylor et al. |
| 2009/0067633 A1* | 3/2009 | Dawson ............... H04L 9/0822 380/279 |
| 2009/0092252 A1 | 4/2009 | Noll et al. |
| 2009/0106552 A1 | 4/2009 | Mohamed |
| 2009/0158033 A1 | 6/2009 | Jeong et al. |
| 2009/0158430 A1 | 6/2009 | Borders |
| 2009/0165076 A1 | 6/2009 | DeCusatis et al. |
| 2009/0165114 A1 | 6/2009 | Baum et al. |
| 2009/0196418 A1 | 8/2009 | Tkacik et al. |
| 2009/0232300 A1 | 9/2009 | Zucker et al. |
| 2009/0241114 A1 | 9/2009 | Kirihata |
| 2009/0244600 A1 | 10/2009 | Haycock et al. |
| 2009/0245519 A1 | 10/2009 | Cachin et al. |
| 2009/0274300 A1* | 11/2009 | Tou ............... H04L 63/0428 380/255 |
| 2009/0276364 A1 | 11/2009 | Iaia et al. |
| 2009/0276514 A1 | 11/2009 | Subramanian |
| 2009/0300356 A1 | 12/2009 | Crandell |
| 2010/0008499 A1 | 1/2010 | Lee et al. |
| 2010/0011448 A1 | 1/2010 | Wagner |
| 2010/0014662 A1 | 1/2010 | Jutila |
| 2010/0017625 A1* | 1/2010 | Johnson ............ G06F 21/6218 713/190 |
| 2010/0017626 A1 | 1/2010 | Sato et al. |
| 2010/0036779 A1 | 2/2010 | Sadeh-Koniecpol et al. |
| 2010/0042583 A1 | 2/2010 | Gervais et al. |
| 2010/0074445 A1 | 3/2010 | Nefedov et al. |
| 2010/0088126 A1 | 4/2010 | Iaia et al. |
| 2010/0095118 A1 | 4/2010 | Meka |
| 2010/0115614 A1 | 5/2010 | Barile et al. |
| 2010/0138218 A1 | 6/2010 | Geiger |
| 2010/0146269 A1* | 6/2010 | Baskaran ............ G06F 21/10 713/165 |
| 2010/0153670 A1 | 6/2010 | Dodgson et al. |
| 2010/0161830 A1 | 6/2010 | Noy et al. |
| 2010/0162347 A1 | 6/2010 | Barile |
| 2010/0165876 A1 | 7/2010 | Shukla et al. |
| 2010/0174919 A1 | 7/2010 | Ito et al. |
| 2010/0185850 A1 | 7/2010 | Liu |
| 2010/0185863 A1 | 7/2010 | Rabin et al. |
| 2010/0211781 A1 | 8/2010 | Auradkar et al. |
| 2010/0211782 A1 | 8/2010 | Auradkar et al. |
| 2010/0235635 A1* | 9/2010 | Kshirsagar ............ H04L 63/08 713/168 |
| 2010/0241848 A1 | 9/2010 | Stuber et al. |
| 2010/0242088 A1 | 9/2010 | Thomas |
| 2010/0250965 A1 | 9/2010 | Olson et al. |
| 2010/0254537 A1* | 10/2010 | Buer ............... H04L 9/083 380/279 |
| 2010/0266132 A1* | 10/2010 | Bablani ............ H04W 12/126 380/286 |
| 2010/0268788 A1 | 10/2010 | Arimilli et al. |
| 2010/0269171 A1 | 10/2010 | Raz et al. |
| 2010/0289627 A1 | 11/2010 | McAllister et al. |
| 2010/0299313 A1 | 11/2010 | Orsini et al. |
| 2010/0303241 A1 | 12/2010 | Breyel |
| 2010/0306850 A1* | 12/2010 | Barile ............... G06F 21/566 726/25 |
| 2010/0316219 A1 | 12/2010 | Boubion et al. |
| 2010/0318782 A1 | 12/2010 | Auradkar et al. |
| 2010/0325732 A1 | 12/2010 | Mittal et al. |
| 2010/0332401 A1 | 12/2010 | Prahlad et al. |
| 2011/0022642 A1* | 1/2011 | deMilo ............... G06F 21/602 707/805 |
| 2011/0055558 A1 | 3/2011 | Liu et al. |
| 2011/0072264 A1 | 3/2011 | McNulty |
| 2011/0083163 A1 | 4/2011 | Auvenshine et al. |
| 2011/0083190 A1 | 4/2011 | Brown et al. |
| 2011/0087898 A1 | 4/2011 | Williams |
| 2011/0099362 A1 | 4/2011 | Haga et al. |
| 2011/0113466 A1 | 5/2011 | Stringham et al. |
| 2011/0113467 A1 | 5/2011 | Agarwal et al. |
| 2011/0116636 A1 | 5/2011 | Steed |
| 2011/0145571 A1 | 6/2011 | Schmidt-Karaca et al. |
| 2011/0154031 A1 | 6/2011 | Banerjee et al. |
| 2011/0154057 A1 | 6/2011 | England et al. |
| 2011/0173435 A1 | 7/2011 | Liu et al. |
| 2011/0178933 A1 | 7/2011 | Bailey |
| 2011/0191462 A1 | 8/2011 | Smith |
| 2011/0209053 A1 | 8/2011 | Stronger et al. |
| 2011/0209064 A1 | 8/2011 | Jorgensen et al. |
| 2011/0213971 A1 | 9/2011 | Gurel et al. |
| 2011/0225423 A1 | 9/2011 | Lynch |
| 2011/0225431 A1* | 9/2011 | Stufflebeam, Jr. ...... G06F 21/62 713/190 |
| 2011/0244440 A1 | 10/2011 | Saxon et al. |
| 2011/0246765 A1 | 10/2011 | Schibuk |
| 2011/0252071 A1* | 10/2011 | Gidon ............... G06F 16/178 707/802 |

(56) References Cited

U.S. PATENT DOCUMENTS

| | | | |
|---|---|---|---|
| 2011/0258437 A1 | 10/2011 | McKelvey et al. | |
| 2011/0258443 A1 | 10/2011 | Barry | |
| 2011/0270872 A1 | 11/2011 | Alvarez et al. | |
| 2011/0289134 A1 | 11/2011 | de los Reyes et al. | |
| 2011/0289314 A1 | 11/2011 | Whitcomb | |
| 2011/0296497 A1 | 12/2011 | Becker | |
| 2011/0320819 A1* | 12/2011 | Weber | H04L 9/0825 713/176 |
| 2012/0036370 A1* | 2/2012 | Lim | G06F 21/6218 713/189 |
| 2012/0042162 A1* | 2/2012 | Anglin | G06F 21/6218 713/165 |
| 2012/0079289 A1 | 3/2012 | Weng et al. | |
| 2012/0096272 A1 | 4/2012 | Jasper et al. | |
| 2012/0114118 A1 | 5/2012 | Verma | |
| 2012/0124612 A1 | 5/2012 | Adimatyam et al. | |
| 2012/0131354 A1 | 5/2012 | French | |
| 2012/0134495 A1 | 5/2012 | Liu | |
| 2012/0140923 A1 | 6/2012 | Lee et al. | |
| 2012/0144233 A1 | 6/2012 | Griffith et al. | |
| 2012/0151551 A1* | 6/2012 | Readshaw | G06F 21/604 726/1 |
| 2012/0159148 A1 | 6/2012 | Behren et al. | |
| 2012/0159518 A1* | 6/2012 | Boliek | G06F 3/0643 719/318 |
| 2012/0170753 A1* | 7/2012 | Pandrangi | G06F 21/6209 380/286 |
| 2012/0173881 A1* | 7/2012 | Trotter | H04L 9/0894 713/189 |
| 2012/0185913 A1 | 7/2012 | Martinez et al. | |
| 2012/0191979 A1 | 7/2012 | Feldbau | |
| 2012/0198042 A1 | 8/2012 | Dunbar et al. | |
| 2012/0204032 A1 | 8/2012 | Wilkins et al. | |
| 2012/0216041 A1* | 8/2012 | Naono | H04L 9/0894 713/171 |
| 2012/0240183 A1 | 9/2012 | Sinha | |
| 2012/0243685 A1 | 9/2012 | Tanaka et al. | |
| 2012/0254090 A1 | 10/2012 | Burris et al. | |
| 2012/0260094 A1 | 10/2012 | Asim et al. | |
| 2012/0266218 A1 | 10/2012 | Mattsson | |
| 2012/0281839 A1* | 11/2012 | Arnold | H04L 9/088 380/277 |
| 2012/0290850 A1 | 11/2012 | Brandt et al. | |
| 2012/0291101 A1 | 11/2012 | Ahlstrom et al. | |
| 2012/0297183 A1 | 11/2012 | Mukkara et al. | |
| 2012/0297189 A1* | 11/2012 | Hayton | G06F 16/183 713/165 |
| 2012/0297200 A1* | 11/2012 | Thom | G06F 21/6209 713/189 |
| 2012/0300936 A1 | 11/2012 | Green | |
| 2012/0303961 A1 | 11/2012 | Kean et al. | |
| 2012/0311675 A1 | 12/2012 | Ham et al. | |
| 2012/0314854 A1 | 12/2012 | Waters | |
| 2012/0321078 A1 | 12/2012 | Chambers | |
| 2012/0321086 A1 | 12/2012 | D'Zouza et al. | |
| 2012/0323717 A1 | 12/2012 | Kirsch | |
| 2012/0323990 A1 | 12/2012 | Hayworth | |
| 2012/0331293 A1 | 12/2012 | Ma et al. | |
| 2013/0007464 A1 | 1/2013 | Madden | |
| 2013/0013931 A1 | 1/2013 | O'Hare et al. | |
| 2013/0031155 A1 | 1/2013 | Terrano et al. | |
| 2013/0031255 A1 | 1/2013 | Maloy et al. | |
| 2013/0031356 A1 | 1/2013 | Prince et al. | |
| 2013/0044878 A1 | 2/2013 | Rich et al. | |
| 2013/0047034 A1 | 2/2013 | Salomon et al. | |
| 2013/0085936 A1 | 4/2013 | Law et al. | |
| 2013/0086661 A1* | 4/2013 | Roth | H04L 9/3242 726/7 |
| 2013/0091350 A1* | 4/2013 | Gluck | H04L 63/0471 713/153 |
| 2013/0097320 A1 | 4/2013 | Ritter et al. | |
| 2013/0103834 A1 | 4/2013 | Dzerve et al. | |
| 2013/0111217 A1 | 5/2013 | Kopasz et al. | |
| 2013/0156188 A1 | 6/2013 | Xu et al. | |
| 2013/0157619 A1 | 6/2013 | Di Luoffo et al. | |
| 2013/0159655 A1* | 6/2013 | Lee | G06F 21/6218 711/164 |
| 2013/0159732 A1 | 6/2013 | Leoutsarakos | |
| 2013/0163753 A1 | 6/2013 | MacMillan et al. | |
| 2013/0166703 A1 | 6/2013 | Hammer et al. | |
| 2013/0167196 A1 | 6/2013 | Spencer et al. | |
| 2013/0198521 A1* | 8/2013 | Wu | H04L 9/30 713/175 |
| 2013/0212576 A1 | 8/2013 | Huang et al. | |
| 2013/0269035 A1 | 10/2013 | Bajaj et al. | |
| 2013/0283045 A1 | 10/2013 | Li et al. | |
| 2013/0290716 A1 | 10/2013 | Gavrilov | |
| 2013/0305311 A1 | 11/2013 | Puttaswamy Naga et al. | |
| 2013/0312094 A1* | 11/2013 | Zecheru | H04L 63/1433 726/23 |
| 2013/0316682 A1 | 11/2013 | Vieira | |
| 2013/0326233 A1 | 12/2013 | Tolfmans | |
| 2013/0346747 A1 | 12/2013 | Ignatchenko et al. | |
| 2014/0012751 A1 | 1/2014 | Kuhn et al. | |
| 2014/0020072 A1 | 1/2014 | Thomas | |
| 2014/0047549 A1 | 2/2014 | Bostley, III et al. | |
| 2014/0115327 A1 | 4/2014 | Gorbach et al. | |
| 2014/0122866 A1* | 5/2014 | Haeger | H04L 63/061 713/153 |
| 2014/0164774 A1 | 6/2014 | Nord et al. | |
| 2014/0177829 A1 | 6/2014 | MacMillan et al. | |
| 2014/0201533 A1 | 7/2014 | Kruglick | |
| 2014/0215554 A1 | 7/2014 | Roberts et al. | |
| 2015/0222604 A1 | 8/2015 | Ylonen | |
| 2015/0295941 A1 | 10/2015 | Lim et al. | |
| 2015/0304399 A1 | 10/2015 | Kramer | |
| 2016/0224651 A1 | 8/2016 | Kumarasamy et al. | |
| 2017/0142092 A1 | 5/2017 | Lim | |
| 2018/0045189 A1 | 2/2018 | Lee et al. | |

FOREIGN PATENT DOCUMENTS

| | | |
|---|---|---|
| CN | 101281578 | 10/2008 |
| CN | 101573910 | 11/2009 |
| CN | 101741547 | 6/2010 |
| CN | 101753302 | 6/2010 |
| CN | 102130768 | 7/2011 |
| CN | 102318262 | 1/2012 |
| CN | 102318263 | 1/2012 |
| CN | 102460458 | 5/2012 |
| CN | 102656591 | 9/2012 |
| EP | 2503480 | 9/2012 |
| JP | H09233067 | 9/1997 |
| JP | 2000215240 | 4/2000 |
| JP | 2002140534 | 5/2000 |
| JP | 2000295209 | 10/2000 |
| JP | 2001209582 | 3/2001 |
| JP | 2002540748 | 11/2002 |
| JP | 2003188871 | 7/2003 |
| JP | 2003208355 | 7/2003 |
| JP | 2004126716 | 4/2004 |
| JP | 2005057417 | 3/2005 |
| JP | 2005197912 | 7/2005 |
| JP | 2005258801 | 9/2005 |
| JP | 2005533438 | 11/2005 |
| JP | 2006099548 | 4/2006 |
| JP | 2006279848 | 10/2006 |
| JP | 2006319543 | 11/2006 |
| JP | 200737197 | 2/2007 |
| JP | 2007081482 | 3/2007 |
| JP | 2007507760 | 3/2007 |
| JP | 2007293468 | 11/2007 |
| JP | 2008015669 | 1/2008 |
| JP | 2008134789 | 6/2008 |
| JP | 2008541273 | 11/2008 |
| JP | 2008306418 | 12/2008 |
| JP | 2009064178 | 3/2009 |
| JP | 2009213064 | 9/2009 |
| JP | 2009246800 | 10/2009 |
| JP | 2010124071 | 6/2010 |
| JP | 2010128824 | 6/2010 |
| JP | 2011019129 | 1/2011 |

(56) References Cited

FOREIGN PATENT DOCUMENTS

| | | |
|---|---|---|
| JP | 2011159053 | 8/2011 |
| JP | 2011175578 | 9/2011 |
| JP | 2012073374 | 4/2012 |
| JP | 2012178010 | 9/2012 |
| JP | 2013513834 | 4/2013 |
| JP | 2014501955 | 1/2014 |
| KR | 101145766 | 5/2012 |
| SH | O61177479 | 8/1986 |
| WO | WO0154099 | 7/2001 |
| WO | WO2004008676 | 1/2004 |
| WO | WO2009060283 | 5/2009 |
| WO | WO2010001150 | 1/2010 |
| WO | WO2010093559 | 8/2010 |
| WO | WO2011083343 | 7/2011 |
| WO | WO2011089712 | 7/2011 |
| WO | WO2012060979 | 5/2012 |
| WO | WO2012109640 | 8/2012 |
| WO | WO2013145517 | 3/2013 |

OTHER PUBLICATIONS

Australian Examination Report No. 2, dated Mar. 5, 2019, for Patent Application No. 2017204853, 3 pages.
Australian Notice of Acceptance for Patent Application No. 2017204853 dated May 16, 2019, 3 pages.
Barker et al., "Recommendation for Random No. Generation Using Deterministic Random Bit Generators," National Institute Standards and Technology Special Publication 800-90A, Jan. 2012, 136 pages.
Bernstein et al., "The Poly1305-AES Message-Authentication Code," Lecture Notes in Computer Science, Department of Mathematics, Statistics, and Computer Science (M/C 249), The University of Illinois at Chicago, Feb. 21, 2005, 18 pages.
BETHENCOURT et al., "Ciphertext-Policy Attribute-Based Encryption," IEEE Symposium on Security and Privacy 2007, 15 pages.
Canadian Notice of Allowance for Patent Application No. 2,899,014 dated Feb. 8, 2018, 1 page.
Canadian Notice of Allowance for Patent Application No. 2,916,954 dated Dec. 19, 2017, 1 page.
Canadian Notice of Allowance, dated Jun. 25, 2019, for Patent Application No. 2,898,995, 1 page.
Canadian Office Action for Patent Application No. 2,898,995 dated Jul. 3, 2018, 9 pages.
Canadian Office Action for Patent Application No. 2,899,008 dated Mar. 1, 2019, 4 pages.
Canadian Office Action for Patent Application No. 2,899,008 dated Mar. 14, 2018, 4 pages.
Canadian Office Action for Patent Application No. 2,899,019 dated Jul. 3, 2018, 8 pages.
Canadian Office Action for Patent Application No. 2,899,019 dated Mar. 25, 2019, 8 pages.
Canadian Office Action for Patent Application No. 2,899,027 dated Jul. 17, 2018, 6 pages.
Canadian Office Action for Patent Application No. 2,899,027 dated May 13, 2019, 6 pages.
Canadian Office Action for Patent Application No. 2,916,954 dated Feb. 11, 2019, 4 pages.
Chinese Decision on Grant for Patent Application No. 201480046236.7 dated Jan. 4, 2019, 4 pages.
Chinese Decision on Rejection for Patent Application No. 201480011965.9 dated Jan. 15, 2018, 6 pages.
Chinese Decision on Rejection for Patent Application No. 201480013039.5 dated Apr. 12, 2019, 15 pages.
Chinese First Office Action for Patent Application No. 201480020482.5, dated Dec. 28, 2017, 11 pages.
Chinese First Office Action for Patent Application No. 201480046236.7, dated Feb. 24, 2018, 11 pages.
Chinese Fourth Office Action for Patent Application No. 201480011965.9 dated May 20, 2019, 5 pages.
Chinese Notice on Grant for Patent Application No. 201480011965.9 dated Aug. 22, 2019, 4 pages.
Chinese Notice on Grant of Patent for Application No. 201480020500.X dated Dec. 28, 2017, 4 pages.
Chinese Notice on the Second Office Action for Patent Application No. 201480020517.5 dated Jan. 3, 2018, 8 pages.
Chinese Second Office Action for Patent Application No. 201480020482.5 dated Jul. 19, 2018, 28 pages.
Chinese Second Office Action, dated Sep. 25, 2018, for Patent Application No. 201480013039.5, 11 pages.
Chinese Third Office Action dated Mar. 15, 2019 for Patent Application No. 201480020482.5, 19 pages.
Chinese Third Office Action for Patent Application No. 201480020517.5 dated Jul. 25, 2018, 6 pages.
Chowdhury et al., "Network Virtualization: State of the Art and Research Challenges", IEEE Communications Magazine, Jul. 2009, 7 pages.
Chowdhury et al., "Virtual Network Embedding With Coordinated Node and Link Mapping", IEEE INFOCOM 2009, Apr. 2009, 9 pages.
European Communication pursuant to Article 94(3) EPC for Application No. 14751237.0 dated May 28, 2018, 4 pages.
European Communication pursuant to Article 94(3) EPC for Application No. 14751612.4 dated Jan. 3, 2018, 4 pages.
European Communication pursuant to Article 94(3) EPC for Application No. 14751881.5 dated Jul. 2, 2019, 4 pages.
European Communication pursuant to Article 94(3) EPC for Application No. 14819866.6 dated Feb. 8, 2019, 4 pages.
European Communication pursuant to Article 94(3) EPC for Patent Application No. 14751881.5 dated Oct. 25, 2018, 5 pages.
European Communication Under Rule 71 (3) EPC for Application No. 14752191.8, Intention to Grant, dated Mar. 22, 2019, 75 pages.
European Official Communication Pursuant to Article 94(3) EPC for Patent Application No. 14751256.0 dated Jan. 3, 2018, 5 pages.
European Official Letter for Patent Application No. 14751881.5 dated Feb. 21, 2018, 3 pages.
Guttman et al., "An Introduction to Computer Security: The NIST Handbook," Special Publication 800-12, Oct. 1, 1995, Sections 17.6 and 18.3.2 and Section 19 for cryptographic tools, XP055298016, retrieved on Aug. 26, 2016, from http://www.davidsalomon.name/CompSec/auxiliary/handbook.pdf.
IEEE, "Draft Standard for Identity-based Public-key Cryptography Using Pairings," IEEE P1363.3/D1, Apr. 2008, retrieved Sep. 22, 2015, from http://grouper.ieee.org/groups/1363/IBC/material/P1363.3-D1-200805.pdf, 85 pages.
International Search Report and Written Opinion dated Apr. 29, 2014, in International Patent Application No. PCT/US2014/015404, filed Feb. 7, 2014.
International Search Report and Written Opinion dated May 28, 2014, in International Patent Application No. PCT/US2014/15697, filed Feb. 11, 2014.
International Search Report and Written Opinion dated May 30, 2014, in International Patent Application No. PCT/US2014/015408, filed Feb. 7, 2014.
International Search Report and Written Opinion dated May 30, 2014, in International Patent Application No. PCT/US2014/015410, filed Feb. 7, 2014.
International Search Report and Written Opinion dated May 30, 2014, International Patent Application No. PCT/US2014/015414, filed Feb. 7, 2014.
International Search Report and Written Opinion dated Oct. 28, 2014, International Patent Application No. PCT/US2014/044861, filed Jun. 30, 2014.
Itani et al., "Privacy as a Service: Privacy-Aware Data Storage and Processing in Cloud Computing Architectures," 2009 Eighth IEEE International Conference on Dependable, Autonomic and Secure Computing, pp. 711-716.
Japanese Appeal Decision for Patent Application No. 2016-511994 dated Mar. 12, 2019, 3 pages.
Japanese Final Decision of Rejection for Patent Application No. 2015-558056 dated Mar. 13, 2018, 18 pages.
Japanese Final Decision on Rejection for Patent Application No. 2015-558070 dated Apr. 3, 2018, 7 pages.

(56) References Cited

OTHER PUBLICATIONS

Japanese Notice and Report for Revocation of Reconsideration Report for Patent Application No. 2015-558043 dated Mar. 9, 2018, 6 pages.
Japanese Notice and Report for Revocation of Reconsideration Report for Patent Application No. 2016-524288 dated Apr. 13, 2018, 6 pages.
Japanese Notice of Allowance for Patent Application No. 2015-558042, dated Dec. 27, 2017, 6 pages.
Japanese Notice of Allowance for Patent Application No. 2017-217362 dated Sep. 17, 2019, 6 pages.
Japanese Notice of Allowance for Patent Application No. 2018-133603, dated May 21, 2019, 6 pages.
Japanese Notice of Allowance, dated Oct. 2, 2018, for Patent Application No. 2015-558056, 6 pages.
Japanese Notice of Final Rejection for Patent Application No. 2015-558070 dated Sep. 3, 2019, 8 pages.
Japanese Notice of Final Rejection for Patent Application No. 2017-232031 dated Mar. 26, 2019, 13 pages.
Japanese Notice of Rejection for Patent Application No. 2017-217362 dated Feb. 12, 2019, 9 pages.
Japanese Notice of Rejection, dated Jun. 4, 2019, for Patent Application No. 2016-524288, 9 pages.
Japanese Notice of Rejection, dated May 14, 2019, for Patent Application No. 2018-000819, 12 pages.
Japanese Notice of Rejection, dated Oct. 9, 2018, for Patent Application No. 2016-524288, 21 pages.
Japanese Notice of Rejection, dated Sep. 4, 2018, for Patent Application No. 2015-558043, 25 pages.
Japanese Notice of Revocation for Reconsideration and Report, dated Dec. 4, 2018, for Patent Application No. 2015-558070, 4 pages.
Japanese Report on Notice of Allowance for Patent Application No. 2015-558044 dated Mar. 27, 2018, 6 pages.
Korean Notice of Preliminary Amendment, dated Apr. 4, 2019, for Patent Application No. 10-2017-7022249, 8 pages.
Krawczyk et al., "HMAC-based Extract-and-Expand Key Derivation Function (HKDF)," Internet Engineering Task Force (IETF), May 2010, retrieved Sep. 22, 2015, from https://tools.ietf.org/html/rfc5869, 14 pages.
Manulis, et al., "Group Signatures: Authentication with Privacy," retrieved from https://www.bsi.bund.de/SharedDocs/Downloads/EN/BSI/Publications/Studies/GruPA/GruPA.pdf?_blob=publicationFile, Published May 15, 2010, 267 pages.
Nikkei Trendy, "Simple Input of URL Using Hosts File," Nikkei Business Publications, Inc., Feb. 6, 2006, retrieved Dec. 21, 2016, from http://trendy.nikkeibp.co.jp/article/tec/winxp/20060131/115213/?45=nocnt, 5 pages.
NIST, "Implementation Guidance for FIPS PUB 140-1 and the Cryptographic Module Validation Program," Jan. 10, 2002, 63 pages.
NIST, "Implementation Guidance for FIPS PUB 140-2 and the Cryptographic Module Validation Program," Initial Release Mar. 28, 2003, 205 pages.
Olexiy et al., "Starting Share Files with NFS," Linux Journal, dated Jan. 1, 2002, retrieved on Jan. 2, 2018, from http://www.linuxjournal.com/article/4880?page=0,0, 13 pages.
Rahumed et al., "A Secure Cloud Backup System with Assured Deletion and Version Control," 2011 International Conference on Parallel Processing Workshops, IEEE Computer Society, 8 pages.
Rescorla, "Diffie-Hellman Key Agreement Method," Network Working Group, RTFM Inc., Jun. 1999, retrieved on Sep. 22, 2015, from https://tools.ietf.org/html/rfc2631, 13 pages.
Sieloff, "The new systems administrator: The role of becoming root," Inside Solaris, Oct. 2002, 8(10):6-9.
Singapore Notice of Eligibility for Grant, dated Feb. 5, 2018, for Patent Application No. 11201510650U, 3 pages.
Stack Exchange, "Storing secrets in software," by ninefingers, Stack Exchange Security Blog, dated Sep. 6, 2011, retrieved on Jan. 2, 2018, from http://security.blogoverflow.com/2011/09/storing-secrets-in-software/, 3 pages.
Wikipedia, "IEEE P1363" an Institute of Electrical and Electronics Engineers (IEEE) standardization project for public-key cryptography, retrieved Sep. 22, 2015, from https://en.wikipedia.org/wiki/IEEE_P1363, 3 pages.
Wikipedia, "Key derivation function," retrieved Sep. 22, 2015, from https://en.wikipedia.org/wiki/Key_derivation_function, 4 pages.
Zhu et al., "Algorithms for assigning substrate network resources to virtual network components", IEEE INFOCOM 2006, Apr. 2006, 12 pages.
Chinese Third Office Action for Patent Application No. 201480013039.5 dated Dec. 13, 2019, 7 pages.
European 94(3) Communication for Patent Application No. 14819866.6 dated Nov. 18, 2019, 5 pages.
India First Examination Report for Patent Application No. 7421/DELNP/2015 dated Dec. 27, 2019, 7 pages.
India First Examination Report for Patent Application No. 7426/DELNP/2015 dated Dec. 26, 2019, 8 pages.
India First Examination Report for Patent Application No. 7428/DELNP/2015 dated Jan. 29, 2020, 8 pages.
India First Examination Report for Patent Application No. 7474/DELNP/2015 dated Dec. 26, 2019, 7 pages.
Chinese Notice to Grant for Patent Application No. 201480020482.5 dated Oct. 10, 2019, 4 pages.
European Communication Rule 69 for Patent Application No. 19187650.7 dated Nov. 7, 2019, 7 pages.
India First Examination Report for Patent Application No. 7420/DELNP/2015 dated Oct. 21, 2019, 6 pages.
India First Examination Report for Patent Application No. 201617000381 dated Sep. 10, 2019, 7 pages.
Japanese Appeal Decision for Patent Application No. 2016-524288 dated Nov. 5, 2019, 3 pages.
Korean Decision of Grant for Patent Application No. 10-2017-7022249 dated Sep. 6, 2019, 3 pages.
Brazil Preliminary Office Action for Patent Application No. BR1120150193781 dated Mar. 3, 2020, 7 pages.
Canadian Office Action for Patent Application No. 2,899,019 dated Feb. 17, 2020, 5 pages.
Canadian Office Action for Patent Application No. 2899008 dated Feb. 19, 2020,2 pages.
Canadian Office Action for Patent Application No. 2916954 dated Feb. 19, 2020, 5 pages.
European Rule 71(3) Communication Patent Application No. 14751881.5 dated Feb. 21, 2020, 109 pages.
Japanese Appeal Decision for Patent Application No. 2015-558070 dated Feb. 18, 2020, 3 pages.
Japanese Decision on Final Rejection for Patent Application No. 2017-232031 dated Mar. 3, 2020, 4 pages.
Japanese Final Decision on Rejection for Patent Application No. 2018-000819 dated Feb. 4, 2020, 6 pages.
European Communication pursuant to Article 94(3) EPC for Application No. 14819866.6 dated Aug. 20, 2020, 3 pages.
Japanese Notice of Allowance for Patent Application No. 2018-000819 dated Aug. 18, 2020, 6 pages.
Japanese Notice of Final Rejection for Patent Application No. 2020-097937 dated Aug. 18, 2020, 14 pages.
Canadian Notice of Allowance for Patent Application No. 2,899,027 dated May 11, 2020, 1 page.
Canadian Office Action for Patent Application No. 2,898,995 dated Jul. 31, 2020, 3 pages.
Chinese Notice of Grant for Patent Application No. 201480013039.5 dated Jun. 4, 2020, 4 pages.
Japanese Notice for Revocation of Reconsideration for Patent Application No. 2017-232031 dated Sep. 29, 2020, 2 pages.
Japanese Revocation of Reconsideration for Patent Application No. 2017-232031 dated Sep. 29, 2020, 5 pages.
Japanese Notice of Allowance for Patent Application No. 2020-097937, dated Dec. 8, 2020, 6 pages.
Chinese First Office Action for Patent Application No. 01910208697.4 dated Dec. 14, 2020, 11 pages.

(56) References Cited

OTHER PUBLICATIONS

Canadian Notice of Allowance for Patent Application No. 2899008 dated Dec. 21, 2020, 1 page.
Canadian Office Action for Patent Application No. 2,899,019 dated Feb. 3, 2021, 3 pages.
Canadian Office Action for Patent Application No. 3,052,182 dated Nov. 25, 2020, 4 pages.
Canadian Office Action for Patent Application No. 2916954 dated Feb. 1, 2021, 5 pages.
Japanese Notice of Rejection for Patent Application No. 2019-190480 dated Jan. 26, 2021, 7 pages.
Chinese Decision on Rejection for Patent Application No. 201910208697.4 dated Apr. 13, 2021, 6 pages.
Canadian Office Action for Patent Application No. 2,899,008 dated Oct. 19, 2021, 3 pages.
Canadian Office Action for Patent Application No. 3,052,182 dated Aug. 10, 2021, 3 pages.
Chinese Second Office Action for Patent Application No. 201910208697.4 dated Aug. 24, 2021, 17 pages.
European Communication 94(3) for Patent Application No. 19187650.7 dated Aug. 6, 2021, 7 pages.
European Communication 94(3) for Patent Application No. 19203674.7 dated Sep. 2, 2021, 4 pages.
European Search Report for Patent Application No. 21174827.2 dated Sep. 9, 2021, 7 pages.
Japanese Notice of Rejection for Patent Application No. 2017-232031 dated Apr. 27, 2021, 23 pages.
Japanese Office Action for Patent Application No. 2020-114298 dated Sep. 28, 2021, 11 pages.
European Communication Under Rule 71(3) EPC for Application No. 14819866.6 dated Feb. 1, 2021, 69 pages.
India First Examination Report for Patent Application No. 7428/DELNP/2015 dated Nov. 17, 2021, 7 pages.
Japanese Official Notice of Rejection for Patent Application No. 2017-232031 dated Dec. 21, 2021, 4 pages.

\* cited by examiner

DATA LOSS PREVENTION TECHNIQUES

CROSS REFERENCE TO RELATED APPLICATIONS

This application is a divisional of U.S. patent application Ser. No. 13/932,873, filed on Jul. 1, 2013, entitled "DATA LOSS PREVENTION TECHNIQUES," which incorporates by reference for all purposes the full disclosure of U.S. Pat. No. 8,416,709, issued on Apr. 9, 2013, entitled "NETWORK DATA TRANSMISSION ANALYSIS MANAGEMENT," U.S. patent application Ser. No. 13/491,403, filed on Jun. 7, 2012, entitled "FLEXIBLY CONFIGURABLE DATA MODIFICATION SERVICES," U.S. Pat. No. 9,590,959, issued on Mar. 7, 2017, entitled "DATA SECURITY SERVICE," and U.S. Pat. No. 9,286,491, issued on Mar. 15, 2016, entitled "VIRTUAL SERVICE PROVIDER ZONES."

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. Organizations may utilize complex data storage systems to efficiently and cost effectively store data. In many instances, organizations configure and utilize data storage systems hosted and managed by other organizations, thereby reducing infrastructure costs and achieving other advantages. These data storage systems and other services may operate under multiple different jurisdictions, each with their own rules and regulations. With such complex use of computing resources to manage, ensuring that access to the data is authorized and generally that the data is secure can be challenging, especially as the size and complexity of such configurations grow.

BRIEF DESCRIPTION OF THE DRAWINGS

Various embodiments in accordance with the present disclosure will be described with reference to the drawings, in which.

DETAILED DESCRIPTION

Figure 1:
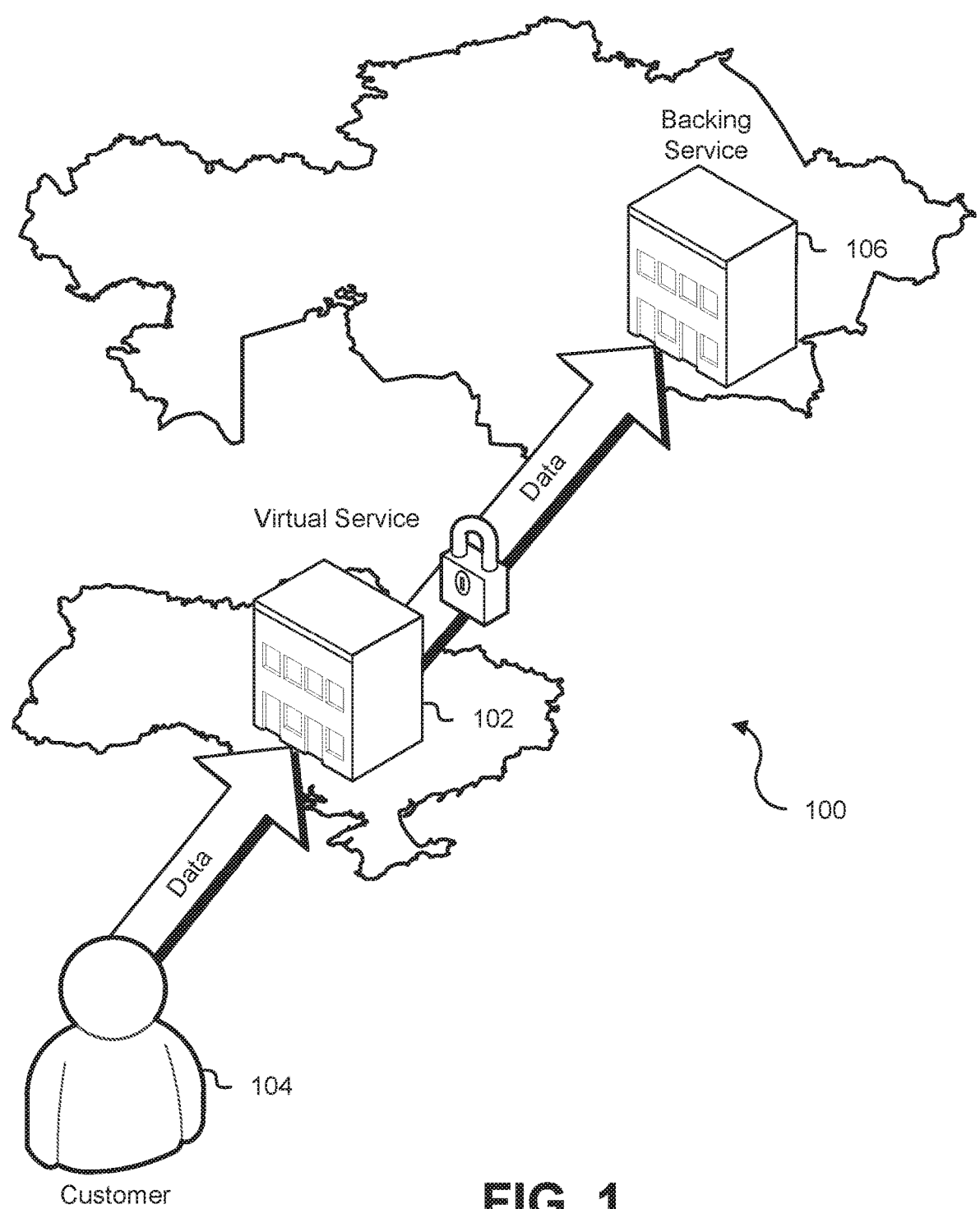
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein provide the ability to offer various computing resource services, such as data storage services, in various zones without the need to build full infrastructures in those zones. In some examples, the zones correspond to facilities in different geopolitical boundaries. Various geographic regions may have their own rules, laws and/or regulations with respect to the handling of other people's data. For instance, one regulation may require that certain types of data remain in country. Similar regulations may be in force in multiple geographic regions. At the same time, many organizations find it advantageous to utilize various computing resource services. Such services may not be available in all jurisdictions or better and/or more economical services may be provided in other regions.

In many instances, compliance with such regulations may be achieved by encrypting data before the data leaves a regulated jurisdiction. Techniques of the present disclosure, accordingly, allow various data-related services to be provided to multiple geographic regions while maintaining compliance with the differing rules, laws and/or regulations. Generally, the techniques described and suggested herein allow for the providing of services in multiple zones, where the zones may, but do not necessarily, correspond to different sovereign entities. For instance, different zones may be different computer networks governed by different entities, whether those entities be governmental agencies of a sovereign entity, corporations, organizations, divisions within an organization, individuals and/or others. Other example zones are discussed in more detail below.

In various embodiments, a service interface, such as a web service interface, is provided in one zone. In some examples, the service operates in an Internet Point of Presence (PoP). The service interface may operate as a virtual application programming interface (API) endpoint for a service whose supporting infrastructure is in another zone (e.g., under another political (legal) jurisdiction). Accordingly, the service interface may operate to receive and respond to requests submitted to the service interface while fulfillment of some or even all the requests, may require the use of the infrastructure in the other zone. In this manner, customers may utilize the service interface to utilize a service as if the customers were utilizing a service with fully supporting infrastructure in the zone. In other words, from the perspective of the customers, a computing resource provides instances of a service in multiple zones, but behind the scenes, the processing of a request for a particular zone may occur, at least in part, using the instance of a service of another zone. For example, a web service request to store data may be fulfilled by the service interface by transmitting the data for persistent storage to the service in the other zone. Similarly, a data retrieval request may be fulfilled by retrieving data persistently stored in the infrastructure of the service in the other zone. In this manner, a full infrastructure does not need to be constructed and maintained for every zone wherein there may be legal restrictions on the export of certain types of information.

To comply with various rules, laws, regulations and/or preferences, some or even all data passing through the service interface to a service in another zone may be encrypted using cryptographic keys that are maintained within the zone of the service interface and/or generally in a zone that is outside of the zone of the supporting service infrastructure. In this manner, while in the zone of the supporting service infrastructure, the data is secure and inaccessible without access to appropriate cryptographic keys in another zone. The data that is encrypted may be generally or selectively encrypted. The data which is encrypted may also be configurable by a customer on behalf of whom the data is stored. In addition, the data that is encrypted and whether the data is encrypted may be determined in accordance with one or more data loss prevention (DLP) policies. In addition, while various illustrative embodiments of the present disclosure utilize encryption for the purpose of illustration, various other techniques may also be used. For example, the various techniques described herein include various manipulation (mangling) of data, where the type of mangling to be applied may be customer configurable.

Returning to the illustrative examples of encryption of data, in some embodiments, the service interface operating as an API proxy utilizes a cryptography service within the same zone. The cryptography service may securely manage cryptographic keys used for encrypting and decrypting and possibly for performing other cryptographic operations, such as message signing. When data is to be encrypted, the service interface may utilize the cryptography service to encrypt the data before the data is transmitted to the other service in the other zone. Similarly, when data is to be decrypted, the service interface may utilize the cryptography service to decrypt the data. Illustrative manners in which the cryptography service may be utilized appear below. An example cryptography service can be found in U.S. patent application Ser. No. 13/764,963, filed on Feb. 12, 2013, entitled "DATA SECURITY SERVICE," which is incorporated herein by reference.

The instances of a service type of a service provider may be utilized by a customer to restrict access to certain data by certain individuals, such as to comply with one or more regulations. As an example, the set of operators (e.g., individuals with authority to make requests to a service of the computing resource service provider on behalf of a customer) may have different vetting properties or qualifications than another set of operators for another service. For example, as noted above and discussed in more detail below, a service provider, may operate a first service in a first region and a second service in a second region (e.g., in a different legal jurisdiction than the first region) where, for at least some requests to the first service, the first service acts as a proxy for the second service. The operators of the first service may be required to have certain qualifications which are different than the qualifications (if any) required for utilizing the second service. Example qualifications include, but are not limited to: having passed a background investigation; having a particular nationality or location; being subject to certain nondisclosure obligations; having a certain security clearance level; having a certain job title (e.g., attorney); and the like. To enable enforcement of such restrictions, the service provider can require different authentication credentials for one service than for another service. As an example, a signing key used to sign requests to the first service may not be usable for the second service. In this manner, distribution of signing keys to individuals with the appropriate qualifications can be used to ensure that data access is in compliance with various regulations despite the data passing from one region to another.

FIG. 1 shows an illustrative example of an environment 100 in which various embodiments may be practiced. In the environment illustrated in FIG. 1 a virtual service 102 is provided. The virtual service 102 may be configured to provide a service interface, such as a web service interface, usable by customers 104 for the purposes of utilizing various computing resource services. In some embodiments the virtual service 102 operates as a proxy for a backing service 106. As discussed in more detail below, the virtual service 102 and the backing service 106 may be separate instances of the same overall service type (e.g., a data storage service with network endpoints in different geographical regions). For example, the backing service 106 may be a collection of computing resources such as servers, data storage devices, and networking equipment configured to enable the operation of the computing resources in a network. The backing service 106 may provide the infrastructure needed to process requests submitted to the virtual service 102. For example, the virtual service 102 may lack sufficient storage capacity to provide a data storage service. In other words, while the virtual service 102 may include data storage devices, the amount of storage maintained in the virtual service 102 may be insufficient for processing the requests it receives without use of the backing service 106. Customers 104, nevertheless, can utilize the virtual service 102 for the purpose of utilizing data storage services.

As illustrated in FIG. 1, for example, the customer 104 may transmit data to the virtual service 102, such as through a web service API call to the virtual service 102. The data may be transferred, for instance, in connection with a request to store the data. The virtual service 102 may process the request to store data as if the request had been submitted to the backing service 106. For example, despite the virtual service 102 lacking sufficient storage capacity to provide a data storage service to customers 104, data provided to the virtual service 102 may nevertheless be stored utilizing the infrastructure of the backing service 106. As noted above, various jurisdictional considerations may come into play when utilizing a data storage service. Accordingly, as illustrated in FIG. 1 the virtual service 102 and the backing service 106 in some embodiments are implemented using physical infrastructure such as one or more data center facilities and/or collections of servers, networking equipment, data storage, and the like. In the example illustrated in FIG. 1, the virtual service 102 and backing service 106 are in different countries, although different jurisdictional entities are also considered as being within the scope of the present disclosure.

In order to prevent data that is transmitted to the virtual service 102 from being stored in plaintext form in the backing service 106 which may violate one or more rules, laws, regulations and/or preferences, data from the customer transmitted from the virtual service 102 to the backing service 106 may be encrypted. In various embodiments, the data is encrypted using a cryptographic key that is never provided (without the consent and/or instruction of the customer 104) to a computing device in the jurisdiction in which the backing service 106 is located. For example, in some embodiments, the key used to encrypt the data is maintained securely within the jurisdiction in which the virtual service 102 is located. As discussed in more detail below, some data may be provided from the virtual service 102 to the backing service 106 in plaintext (cleartext) form while other data may be encrypted. Further, some data provided to the virtual service 102 may not be transmitted to the backing service 106, such as when such a transfer of information would violate one or more DLP policies.

It should be noted that while FIG. 1 illustrates data being transmitted to the virtual service 102 by the customer 104 other ways in which the virtual service 102 may obtain data that is transmitted to the backing service 106 may be provided. For example, in some embodiments customers of the customer 104 utilize services of the customer 104 that are implemented using computing resources of a computing resource service provider. Data may be transmitted to the virtual service 102 directly from these customers of the customer 104. As another example, customer data transmitted to the virtual service 102 may be transmitted from a computing device that is physically hosted by a computing resource service provider that operates the virtual service 102. For instance, the customer 104 may provide the virtual service 102 data from a virtual machine instance implemented by the computing resource service provider utilizing a virtual computer system service such as described below.

In addition, while FIG. 1 illustrates data from the customer 104 traveling to the virtual service 102 from outside the jurisdiction in which the virtual service 102 sits, the data may be provided from within that jurisdiction or from a different jurisdiction such as the jurisdiction in which the backing service 106 is located. It should be further be noted that, while the present disclosure discusses various communications and transmissions as coming from a customer 104 or other entity, unless otherwise clear from context, it should be understood that such communications are initiated by one or more computing devices of the customer 104, which may be operating pursuant to synchronous user input and/or in accordance with automated processes. In other words, while the customer 104 may refer to an entity such as an organization when data is described as traveling from the customer 104, unless otherwise clear from context, the data is being provided from a computing device of the customer 104 or a computing device operating on behalf of the customer 104. Other variations and additional features are discussed in more detail below.

Figure 2:
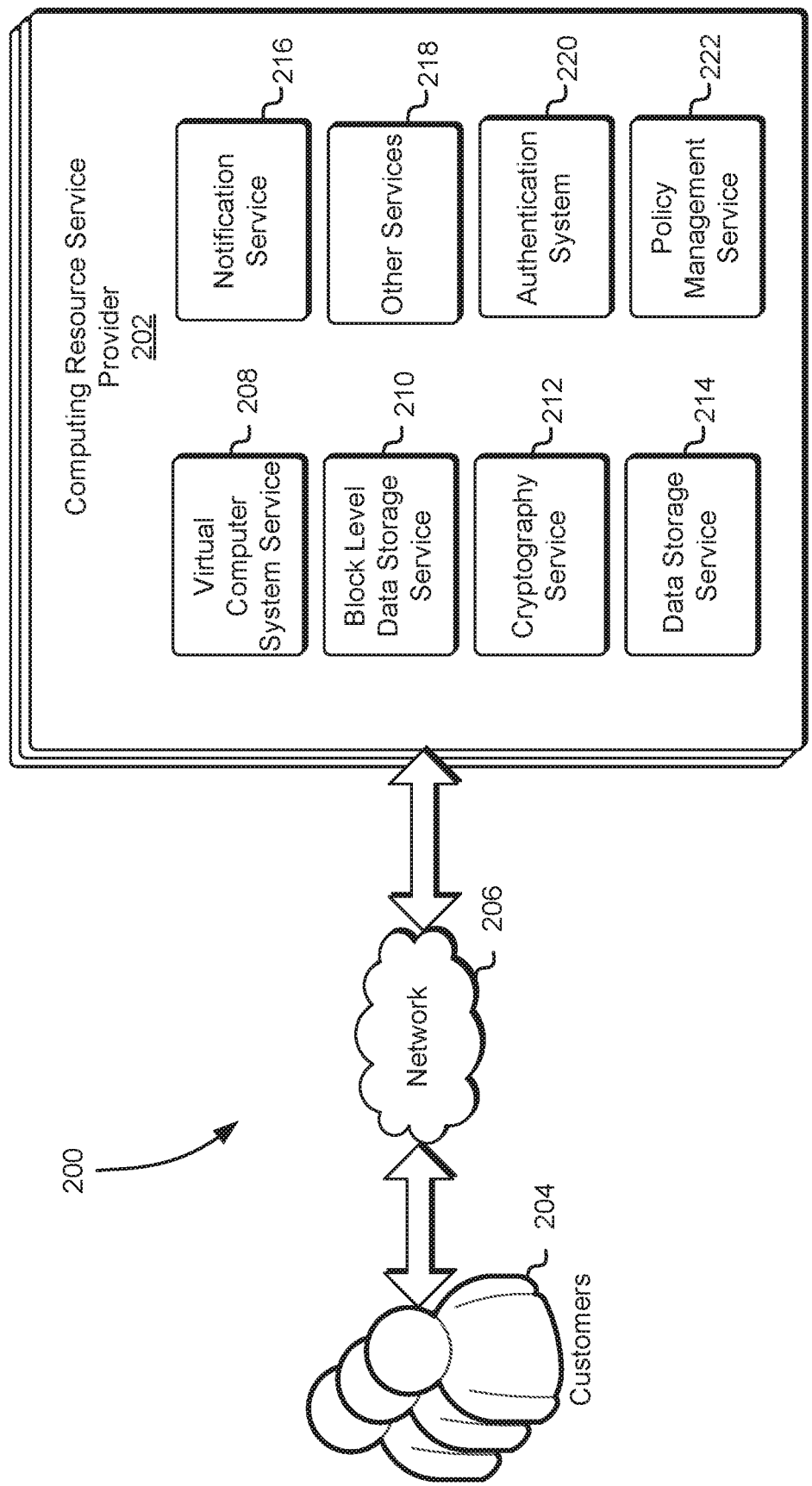
FIG. 2 shows an illustrative example of an environment in which various embodiments may be practiced.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. The services provided by the computing resource service provider, in this example, include a virtual computer system service 208, a block-level data storage service 210, a cryptography service 212 (also referred to as a key management service), a data storage service 214 and one or more other services, although not all embodiments of the present disclosure will include all such services and additional services may be provided in addition to or as an alternative to services explicitly described herein. Each of the services may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the data storage service and/or to access one or more block-level data storage devices provided by the block data storage service).

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service (via appropriately configured and authenticated API calls) to provision and operate virtual computer systems that are instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications.

The block-level data storage service 210 may comprise a collection of computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

As illustrated in FIG. 2, the computing resource service provider 202 may operate a cryptography service, which is described in more detail below in connection with FIG. 3. Generally, the cryptography service may be a collection of computing resources collectively configured to manage and use cryptographic keys for customers of the computing resource service provider. Keys used by the cryptography service 212 may have associated identifiers that the customers can reference when submitting requests to perform cryptographic operations (such as encryption, decryption and message signing) and/or other operations, such as key rotation. The cryptography service may securely maintain the cryptographic keys to avoid access by unauthorized parties.

As noted, the computing resource service provider 202 may also include one or more data storage services 214 which may include an on-demand data storage service and/or an archival data storage service. As on-demand data storage service may be a collection of computing resources configured to synchronously process requests to store and/or access data. The on-demand data storage service may operate using computing resources (e.g., databases) that enable the on-demand data storage service to locate and retrieve data quickly, so as to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects which may be used by the customer 204 to retrieve or perform other operations in connection with the data objects stored by the on-demand data storage service. The on-demand data storage service may also be accessible to the cryptography service 212. For instance, in some embodiments, the cryptography service utilizes the on-demand data storage service to store keys of the customers in encrypted form, where keys usable to decrypt the customer keys are accessible only to particular devices of the cryptography service 212. Access to the data storage service by a customer, another service, or other entity may be through appropriately configured API calls.

An archival storage system may operate differently than an on-demand data storage service. For instance, an archival storage system may be configured to store data in a manner that reduces the costs of storage at the expense of performance in connection with data access. As one illustrative example, the archival storage system may be configured to perform data operations (i.e., store and retrieve data) asynchronously to take advantage of cost savings afforded by batch processing and parallelism. For instance, a client of the archival storage system may receive requests to access data objects stored in the archival storage system, aggregate the requests, process the requests in batches and make the requested data available for retrieval using additional requests. Due to the asynchronous processing, the archival storage system may require another request to retrieve a data object once the data object has been made ready for retrieval, such as by reading the data object from one or more archival data storage devices and writing the data to one or more staging data storage devices from which the data object is available.

The on-demand storage system, on the other hand, may be configured to provide better performance with respect to data access. For example, the on-demand storage system may be configured to synchronously process requests to store and/or access data. To enable better performance relative to the archival storage system, the on-demand storage system may operate using additional computing resources (e.g., databases) that enable the on-demand storage system to locate and retrieve data quickly relative to the archival storage system. The on-demand storage system may provide synchronous data access. For example, the on-demand storage system may maintain stored data in a manner such that, when a request for a data object is retrieved, the data object can be provided (or streaming of the data object can be initiated) in a response to the request.

In the environment illustrated in FIG. 2, a notification service 216 is included. The notification service 216 may comprise a collection of computing resources collectively configured to provide a web service or other interface and browser-based management console that can be used to create topics customers want to notify applications (or people) about, subscribe clients to these topics, publish messages, and have these messages delivered over clients' protocol of choice (i.e., HTTP, email, SMS, etc.). The notification service may provide notifications to clients using a "push" mechanism without the need to periodically check or "poll" for new information and updates. The notification service may be used for various purposes such as monitoring applications executing in the virtual computer system service, workflow systems, time-sensitive information updates, mobile applications, and many others.

The computing resource service provider 202 may additionally maintain one or more other services 218 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

As illustrated in FIG. 2, the computing resource service provider 202, in various embodiments, includes an authentication system 220 and a policy management service 222. The authentication system, in an embodiment, is a computer system (i.e., collection of computing resources) configured to perform operations involved in authentication of users of the customer. For instance, one of the services may provide information from the users to the authentication service to receive information in return that indicates whether or not the user requests are authentic. Determining whether user requests are authentic may be performed in any suitable manner and the manner in which authentication is performed may vary among the various embodiments. For example, in some embodiments, users electronically sign messages (i.e., computer systems operated by the users electronically sign messages) that are transmitted to a service. Electronic signatures may be generated using secret information (e.g., a private key of a key pair associated with a user) that is available to both an authenticating entity (e.g., user) and the authentication system. The request and signatures for the request may be provided to the authentication system which may, using the secret information, compute a reference signature for comparison with the received signature to determine whether the request is authentic.

If the request is authentic, the authentication service may provide information to the service that the service can use to determine whether to fulfill a pending request and/or to perform other actions, such as prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure.

The policy management service 222, in an embodiment, is a computer system configured to manage policies on behalf of customers of the computing resource service provider. The policy management service 222 may include an interface that enables customers to submit requests related to the management of policy. Such requests may, for instance, be requests to add, delete, change or otherwise modify policy for the customer or for other administrative actions, such as providing an inventory of existing policies and the like. The policy management service 222 may also interface with other services to enable the services to determine whether the fulfillment of a pending request is allowable according to policy corresponding to the customer for which the request was made. For example, when a service receives a request, the service (if it has not locally cached such information) may transmit information about the request (and/or the request itself) to the policy management system which may analyze policies for the customer to determine whether existing policy of the customer allows fulfillment of the request and provide information to the service according to the determination.

Figure 3:
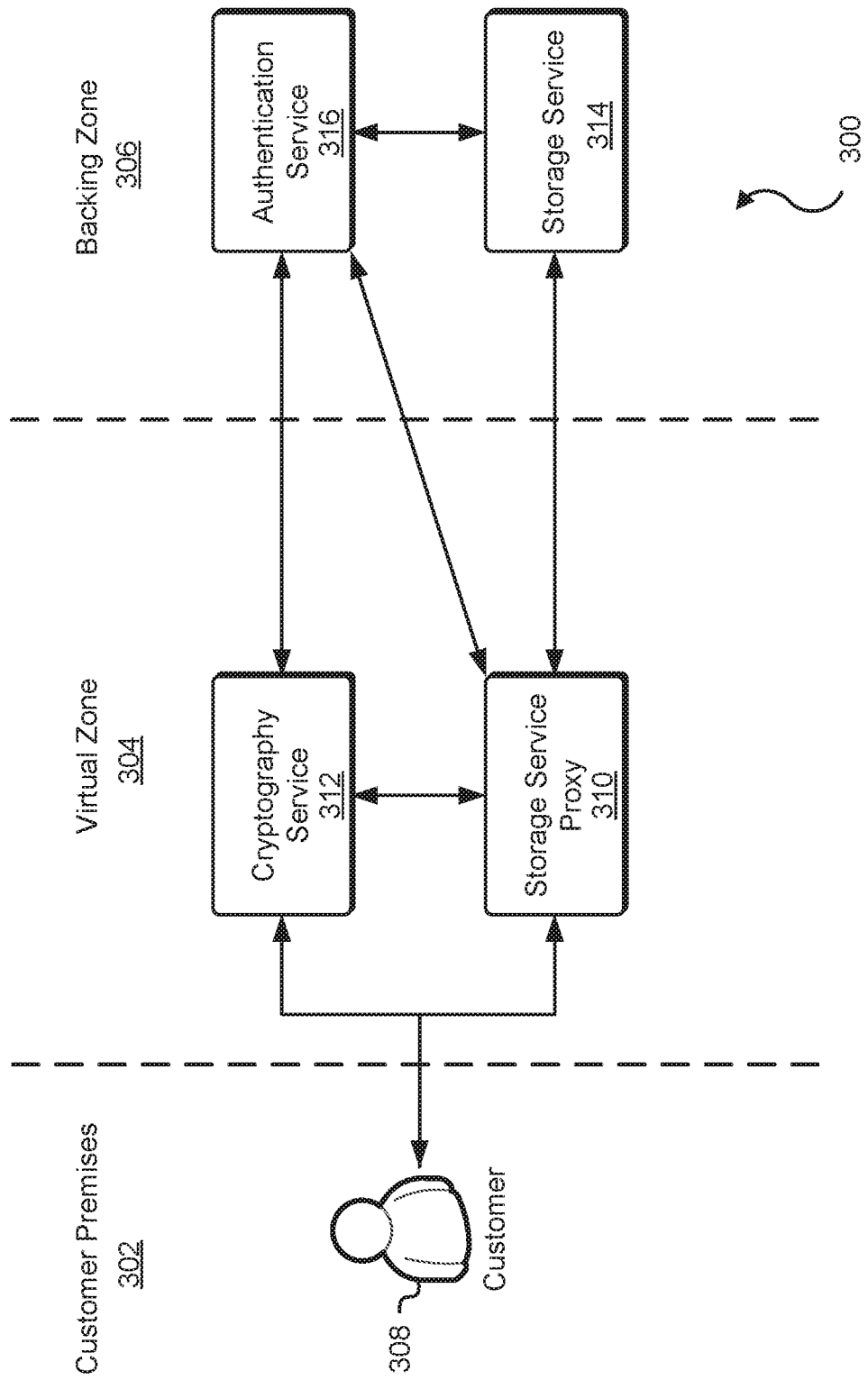
FIG. 3 shows an illustrative example of an environment in which various embodiments may be practiced.

FIG. 3 shows an illustrative example of an environment 300 in which various embodiments may be practiced. As illustrated in FIG. 3, the environment 300 includes three zones, a customer premise 302, a virtual zone 304, and a backing zone 306. Referring to FIG. 1, the customer premises 302 may include facilities operated by and/or on behalf of the customer 104 described above. Similarly, the virtual zone 304 may correspond to facilities operated by a computing resource service provider in a jurisdiction (e.g., political (legal) jurisdiction) different than to which the backing zone 306 corresponds. In other words, the customer premises 302 may correspond to the customer 104, the virtual zone 304 may correspond to the virtual service 102, and the backing zone 306 may correspond to the backing service 106. As noted above however, the zones do not necessarily correspond to differing geopolitical boundaries, but may correspond to other types of administrative control.

For example, the customer premises 302 may correspond to a network of computing resources under administrative control of a customer 308, which may be the customer 104 described above in connection with FIG. 1. Similarly, the virtual zone 304 may correspond to a network of computing resources under the administrative control of a computing resource service provider.

The backing zone 306 may correspond to a network of computing resources under the administrative control of the computing resource service provider or another computing resource service provider. The virtual zone 304 may be implemented in a variety of ways and, generally, as discussed below, the virtual zone 304 is implemented to operate such that, from the perspective of a customer, the virtual zone 304 operates as if it is a fully facilitated backing zone that is independently capable of processing requests without use of the backing zone 306. In other words, despite use of the backing zone 306, the virtual zone 304 is able to receive and cause the processing of requests as if the requests were submitted directly to the backing zone (except for certain manipulations of data, such as encryption that would not otherwise occur if the request were submitted directly to the backing zone 306). For example, as noted above, in some instances the virtual zone 304 may be implemented as an internet PoP in a particular political jurisdiction. The backing zone 306 may correspond to one or more data center facilities having infrastructure capable of providing one or more computing resource services such as described above in connection with FIG. 2.

Turning to the virtual zone 304, as noted above, the virtual zone 304 may include a storage service proxy 310 and a cryptography service 312. As described in more detail below, the storage service proxy 310 may provide a service interface to which the customer 308 can submit requests. The service interface may be accessible at one or more public network addresses, such as one or more public IP addresses. The storage service proxy 310 may utilize the cryptography service 312 to ensure sure that data sent to a storage service 314 of the backing zone 306 is encrypted. The storage service 314 may also provide its own storage interface which may be directly accessible by the customer 308 and/or other customers. The backing zone 306 may also include an authentication service 316. The authentication service 316 may be a collection of computing resources such as described above that serve to enable the storage service proxy 310, cryptograph services 312, and storage service 314 to determine whether to fulfill requests submitted by the customer 308 or by another component of the environment 300.

It should be noted that the storage service proxy 310 and the storage service 314 may correspond to a data storage service of one or more computing resource service providers. For example, the storage service 314 may be an on-demand storage service, an archival data storage service, a block level data storage service, a database service such as a relational data base service, a noSQL database storage service, or a data warehouse data storage service. Generally any service that operates to store data on behalf of one or more customers may be utilized in the environment 300. It should also be noted that while storage services are used for the purpose of illustration, the virtual zone 304 and backing zone 306 may include computing resources for other types of services such as virtual computer system services, computing resource management service, and/or generally any computing resource service that may be provided by a computing resource provider and which may involve access to customer or other sensitive data. Accordingly, the backing zone 306 may include facilities to implement such a service and the virtual zone 304 may include a corresponding service interface that operates as an API proxy for that service. In addition, the virtual zone 304 may also include multiple different services, each with a corresponding service proxy in the virtual zone 304. As noted above, a virtual zone may be provided in various ways and the ways in which a virtual zone may be provided are not limited to that which is illustrated in FIG. 1 and described above.

Figure 4:
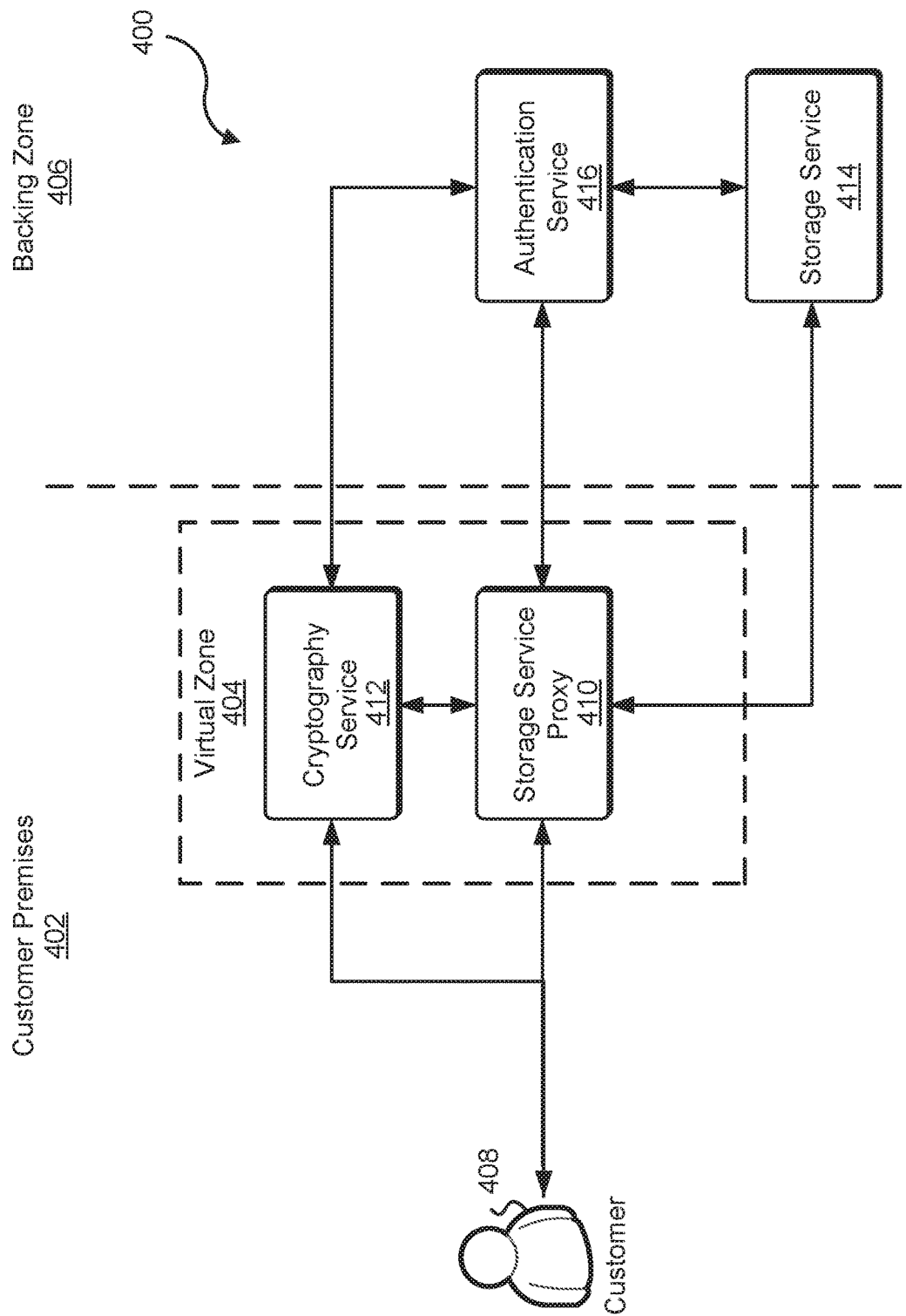
FIG. 4 shows an illustrative example of another environment in which various embodiments may be practiced.

FIG. 4 accordingly shows an illustrative example of an environment 400 in which various embodiments may be practiced. For example, as illustrated in FIG. 4, the environment 400 includes customer premises 402, a virtual zone 404, and a backing zone 406 such as described above in connection with the FIG. 3. For example, the customer premises 402 may include one or more facilities with computing resources of a customer 408 or that is utilized on behalf of the customer 408. As illustrated in FIG. 4, the virtual zone 404 may be a zone located on the customer premises 402. For example, a computing device of a network of the customer premises 402 may provide a web service interface to which requests may be submitted.

In some embodiments, the web service interface is accessible at one or more private network addresses, such as one or more private IP addresses. Customer computing devices or, in some embodiments, any computing devices may submit requests to the interface for the virtual zone 404 in order to have the requests processed which may include use of facilities of the backing zone 406.

As illustrated in FIG. 4, the virtual zone 404, as described above in connection with FIG. 3 includes a storage service proxy 410 and a cryptography service. As noted above, the storage service proxy 410 may include a storage service interface serving as an API proxy for a storage service 414 located in the backing zone 406. As with the storage service proxy 410, requests may be submitted by the customer 408 to the storage service proxy 410 and fulfillment of their requests may utilize the storage service 414. The cryptography service 412 may be utilized by the storage service proxy 410 to ensure that data transmitted to the storage service 414 by the storage service proxy 410 is encrypted when appropriate in accordance with the various embodiments. Similarly, an authentication service 416 in the backing zone 406 may be utilized by the storage service proxy cryptography service 412 and storage service 414 to enable determinations of whether requests are authentically submitted and therefore fulfillable, if otherwise fulfillable (e.g., where fulfillment would be in accordance any applicable policy.

It should be noted that as with all environments described here in variations are considered as being within the scope of the present disclosure. For example, FIG. 4 shows a cryptography service 412 inside of the virtual zone 404. The cryptography service may be operated, for example, as a hardware security module (HSM) or other computing device that manages cryptographic keys on behalf of the customer 408. It should be noted, however, the cryptography service may be located in other zones such as the backing zone 406 or another virtual zone which is not illustrated in the figure. For instance, the cryptography service may be in a virtual zone such as described above in connection with FIG. 3. Generally, the cryptography service may be a service exclusively dedicated to the customer 408 or may be a multitenant service that manages cryptographic keys on behalf of multiple customers of a computing resource service provider as appropriate. It should be also noted that FIG. 4 shows a customer premises having a single virtual zone, however, a customer premise may include multiple virtual zones which may be utilized for various purposes. For example, the customer 408 may be an organization and different virtual zones may be used by different administrative entities within the organization. In this manner, data mingling and other issues which may be of concern to the customer 408 may be managed through the use of multiple virtual zones. Similarly, while a storage service 414 and a storage service proxy 410 are utilized for the purpose of illustration, one or more virtual zones of the customer premises 402 may include multiple service proxies to multiple corresponding services. Generally, the techniques described and suggested herein may be used to enable use of multiple services each with a corresponding proxy.

Further, as noted above, various service proxies may be accessible via public network addresses, such as IP addresses. In some embodiments, a service proxy has a corresponding uniform resource locator (URL) that is different than a URL used for the corresponding backing service. For instance, in the example of a proxy and service being in different geographic jurisdictions, a proxy may have a URL in the form of storageservice<dot>country1<dot>serviceprovider<dot>com while the backing service may have a URL of the form storageservice<dot>country2<dot>serviceprovider<dot>com, where <dot> represents the character in the brackets used for delimiting domains and sub-domains. In other examples, the proxy and the storage service may have the same URL but different public IP addresses. Distributed DNS servers may be configured to resolve the URL to an IP address for the proxy or backing service that is geographically closest. As yet another example of a variation considered as being within the scope of the present disclosure, a backing service may be configured to reroute requests through the proxy so that the backing service receives data in encrypted form, where appropriate. Other variations are also considered as being within the scope of the present disclosure.

Figure 5:
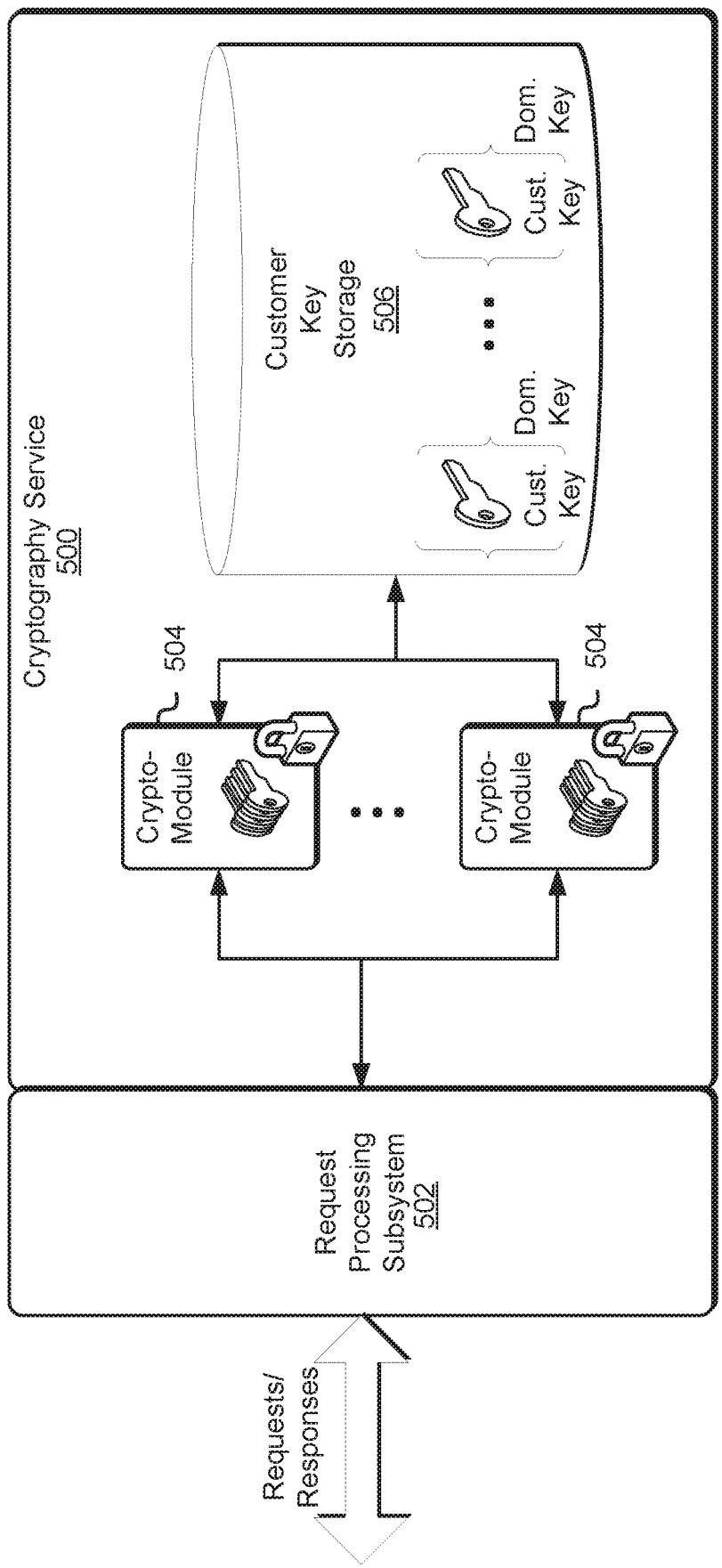
FIG. 5 shows an illustrative example of a cryptography service in accordance with at least one embodiment.

FIG. 5 shows an illustrative example of a cryptography service which may be used to implement various embodiments of the present disclosure. The cryptography service 500 illustrated in FIG. 5 may be used, for example, as the cryptography service described above in connection with FIGS. 2, 3 and 4. In an embodiment the cryptography service 500 includes various subsystems which enable the cryptography service 500 to perform cryptographic operations using cryptographic keys securely managed by the cryptography service 500. For example, as illustrated in FIG. 5 the cryptography service 500 includes a request processing subsystem 502. The request processing subsystem 502 may include one or more web servers and one or more application servers that collectively operate to receive and process requests submitted to the request processing subsystem 502.

In an embodiment the request processing subsystem 502 includes one or more web servers that provide a web service interface to the cryptography service 500 such that web service calls (from a customer or other service) may be made to the request processing subsystem 502 via the web service interface in order to cause the performance of various cryptographic operations. As noted above the cryptography service 500 may securely manage cryptographic keys. Accordingly, various components of the cryptography service 500 may enable such secure management. In an embodiment the cryptography service 500 includes a plurality of cryptographic modules 504 and customer key storage 506. Each cryptographic module 504 may be a subsystem of the cryptography service 500 that securely manages cryptographic keys which may be referred to as domain keys. In an embodiment the cryptographic modules 504 each store a set of one or more domain keys that is common to all of the cryptographic modules 504. In other words each of the cryptographic modules 504 may store one of more of the same domain keys. Storage of the domain keys may be performed so that the domain keys never leave the cryptographic modules 504 and generally are inaccessible to any subsystems of the cryptography service 500 or other systems.

In an embodiment, for example, the cryptographic modules are security modules, which may be hardware security modules (HSMs). The hardware security modules may be configured with computing resources such as processors and memory storing executable instructions that enable the cryptographic modules to perform cryptographic operations. The cryptographic modules may be configured to be tamper-proof such that if intrusion into the interior of the cryptographic modules 504 is detected, domain keys stored within the cryptographic module may be erased, thereby preventing access to the domain keys by way of physical intrusion into a cryptographic module 504. As noted above, in an embodiment the cryptography service 500 includes a repository for customer keys, which is illustrated in FIG. 5 as the customer key storage 506. In alternate embodiments, however, one or more security modules store the customer keys without the use of external customer key storage. In such embodiments, the customer keys may be accessed from memory and there may not be a need to decrypt using a domain key.

Returning to the embodiment illustrated, each customer key corresponds to a corresponding customer of the cryptography service 500, where one customer may have multiple corresponding customer keys but where keys are not shared among customers. As such the cryptography service 500 may store customer keys in the customer key storage 506 for multiple customers. Similarly, the cryptography service 500 may perform various cryptographic operations through the cryptographic modules 504 for multiple customers. As illustrated in FIG. 5, customer keys stored in the customer key storage 506 are encrypted under a domain key stored by the cryptographic modules 504. It should be noted that the brackets around the customer key with the domain key annotating the right-hand brackets is provided as notation indicating encryption of the customer key under the domain key. In this manner customer keys stored in the customer key storage 506 are stored in a manner that requires access to a domain key in order to access the customer key. Thus access to data in the customer key storage 506 does not by itself provide access to data encrypted under a customer key. Therefore, customer keys for multiple customers may be stored external to the cryptographic modules 504, therefore providing scalability without requiring the security modules to store all keys which they may use to perform cryptographic operations.

The cryptographic modules may be configured to, upon a request to perform cryptographic operation, using a specified customer key, access the encrypted specified customer key from the customer key storage 506, use a domain key to decrypt the customer key and use the decrypted customer key to perform the cryptographic operations as discussed in more detail below. It should be noted that while the customer key storage 506 is illustrated as being within the cryptography service 500, the customer key storage may be located in another system such as a data storage service which may be in the same or in a different zone than the cryptography service 500.

Figure 6:
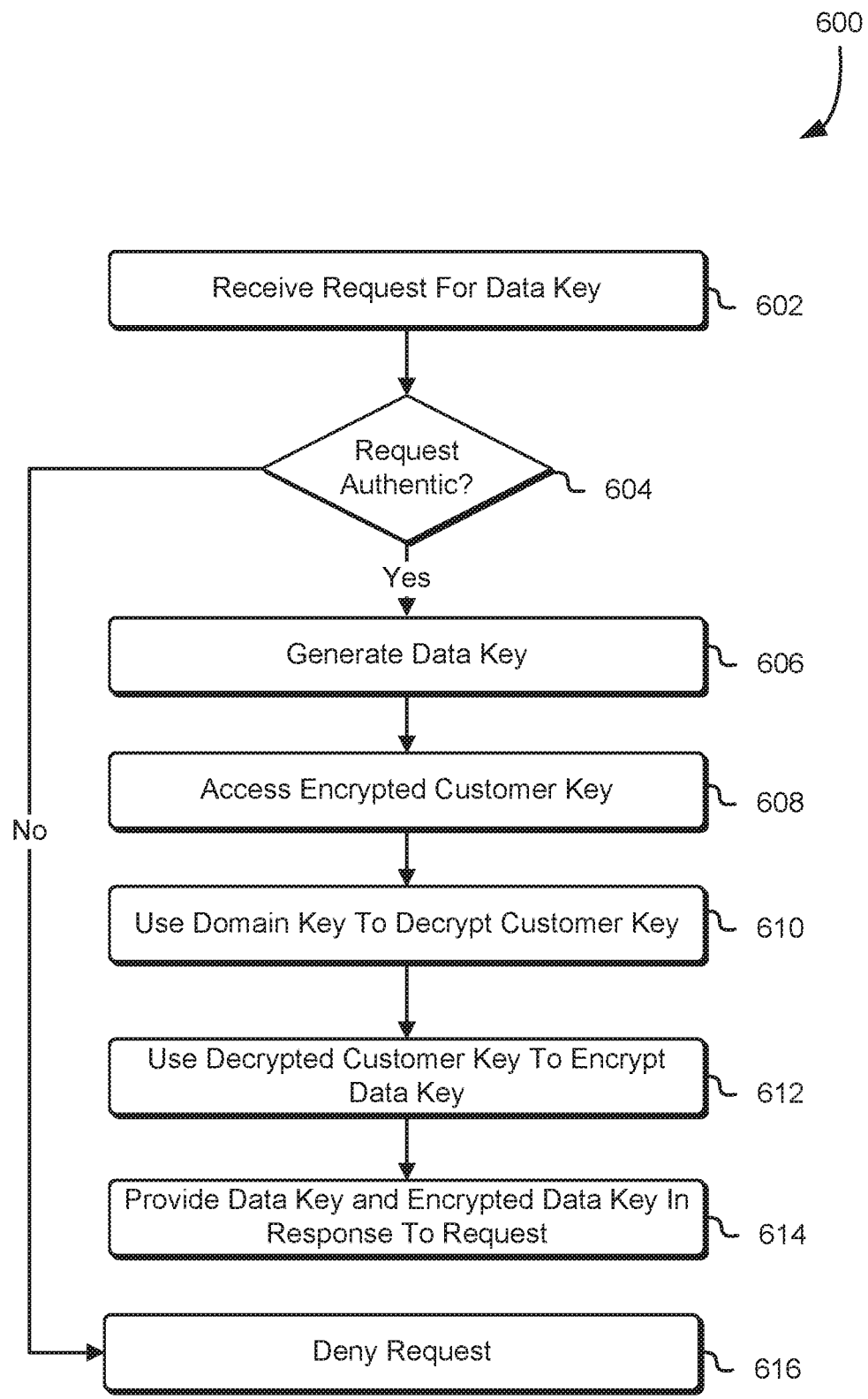
FIG. 6 shows an illustrative example of a process for processing a request for a data key in accordance with at least one embodiment.

FIG. 6 is an illustrated example of a process 600 which may be performed to encrypt a data key used to encrypt data. The process 600 may be performed by any suitable system such as by the cryptography service 500 discussed above in connection with FIG. 5. In an embodiment the process 600 includes receiving 602 a request for a data key. The request 602 may be in the form of an appropriately configured API call such as a web service call with various parameters that enable the system performing the process 600 to select a customer key to be used as described in more detail below to provide a data key. For example, the API call may include a parameter having a value that specifies an identifier for a customer key. It should be noted that the customer key may be implicitly determined. For instance, the request coming from a particular customer may enable the cryptography service to associate the customer key with the customer and determine which customer key to use. In an embodiment the process 600 includes determining 604 whether the request is authentic.

Determination 604 whether the request is authentic may be performed in any suitable manner. For example, in some embodiments the request may be electronically (digitally) signed in a manner that is verifiable by the system performing the process 600 or another system in which the system performing the process 600 communicates. Referring to FIG. 3 the request may be signed using a secret key shared between the customer 308 and the authentication service 316. The cryptography service, if performing the process 600, may provide the request and the signature for the request to the authentication service 316 which may generate a reference signature based on the request and its own copy of the secret key to determine whether the digital signature that was received with the request matches. If the signature generated by the authentication service matches, the authentication service 316 may provide a communication to the cryptography service 312 that the request is authentic, thereby enabling the cryptography service 312 to determine that the request should be fulfilled. A similar process may be performed in connection with FIG. 4.

It should be noted that while not illustrated in the figure, additional determinations regarding whether the request should be processed may be made. For example, process 600 may include determining whether policy allows the request to be fulfilled. The request may be a policy on a key to be used on one of more principals such as a user that submitted the request or otherwise. Such additional operations may also be performed as part of other processes, including those described below. If it is determined that the request is authentic, the process 600 may include generating 606 a data key. A data key may be a cryptographic key to be used to encrypt data, such as data of a request to store the data in a storage service. The data key may be randomly, pseudo-randomly or otherwise generated. In addition, while the process 600 illustrates generation 606 of the data key, a data key may be pre-generated and accessed from memory.

In an embodiment, the process 600 includes accessing 608 an encrypted customer key. Referring to FIG. 5, for example, a cryptographic module 504 of the cryptography service 500 may submit a request to the customer key storage 506 for the encrypted customer key, which may be encrypted under a domain key. The request to the customer key storage 506 may include an identifier of the customer key to be obtained. Once the encrypted customer key has been accessed 608 the process 600 may include using 610 the domain key to decrypt the customer key. The decrypted customer key may then be used 612 to encrypt the data key. The data key and the encrypted data key may then be provided 614 in response to the request, thereby enabling the requester to utilize the data key for the encrypted of data as discussed in more detail below.

Returning to the determination 604 whether the request is authentic, if it is determined 604 that the request is not authentic, such as if an authentication service indicates that the request is not authentic, the process 600 may include denying 616 the request. Denying 616 the request may be performed in various ways in accordance with various embodiments. Denying the request may be performed, for example, by responding the request with an indication that the request was denied and/or one of more reasons for the denial. Denying the request may also include simply inaction such as not responding to the request. Generally any suitable way in which a request may be denied may be used. It should be noted that FIG. 6 and generally all processes described herein show a particular order or operations, although the scope of the present disclosure is not necessarily limited to the order or operations performed therein. For example, FIG. 6 shows generating 606 a data key occurring before access 608 of an encrypted customer key. Further, operations may be performed in a different order or in parallel. Similarly, using 601 the domain key to decrypt a customer key may be performed before generation 606 of the data key or otherwise obtaining the data key. Other variations are also considered as being within the scope of the present disclosure.

Figure 7:
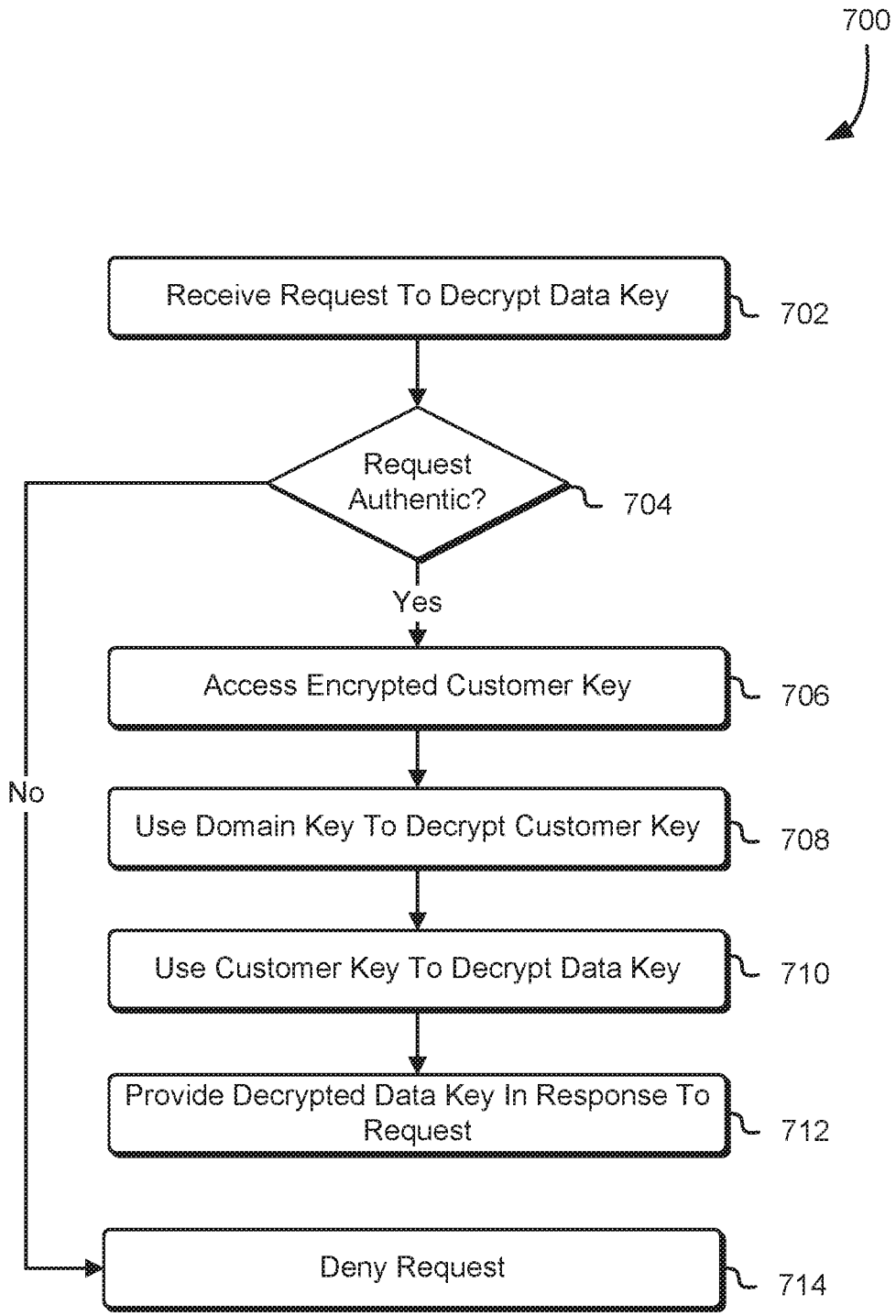
FIG. 7 shows an illustrative example of a process for processing a request to decrypt a data key in accordance with at least one embodiment.

FIG. 7 shows an illustrative example of a process 700 which may be used to decrypt a data key, such as a data key that was used to decrypt data and persisted in encrypted form for later retrieval of the data. The data key may be encrypted in any suitable manner, such as by performance of the process 600 discussed above in connection with FIG. 6. Further, the process 700 may be performed by any suitable system such as the same system that performed the process 600 discussed above in connection with FIG. 6 or another system. In an embodiment the process 700 includes receiving 702 a request to decrypt a data key. The request may be an appropriately configured API call such as described above. The request may originate, for example, from a service proxy such as described above. A determination may be made 704 whether the request is authentic, such as by communicating with an authentication service that analyzes an electronic signature and provides an indication whether the signature is authentic. Further, as discussed above in connection with FIG. 6, other operations may be performed in determining whether to fulfill a request, such as operations in connection with policy enforcement.

Returning to the embodiment illustrated in the figure, if it is determined 704 that the request is authentic, the process 700 may include accessing 706 an encrypted customer key such as described above. The access customer key 708 may then be used 710 to decrypt the data key. The data key may then be provided 712 in response to the request. In this manner a computer system that submitted the request may use the decrypted data key to perform one of more cryptographic operations such as decryption of data that was encrypted under the data key. Returning to the determination 704 whether the request is authentic, the process 700 may include denying 714 the request if determined 704 that the request is not authentic or otherwise upon determining that the request should not be fulfilled.

Figure 8:
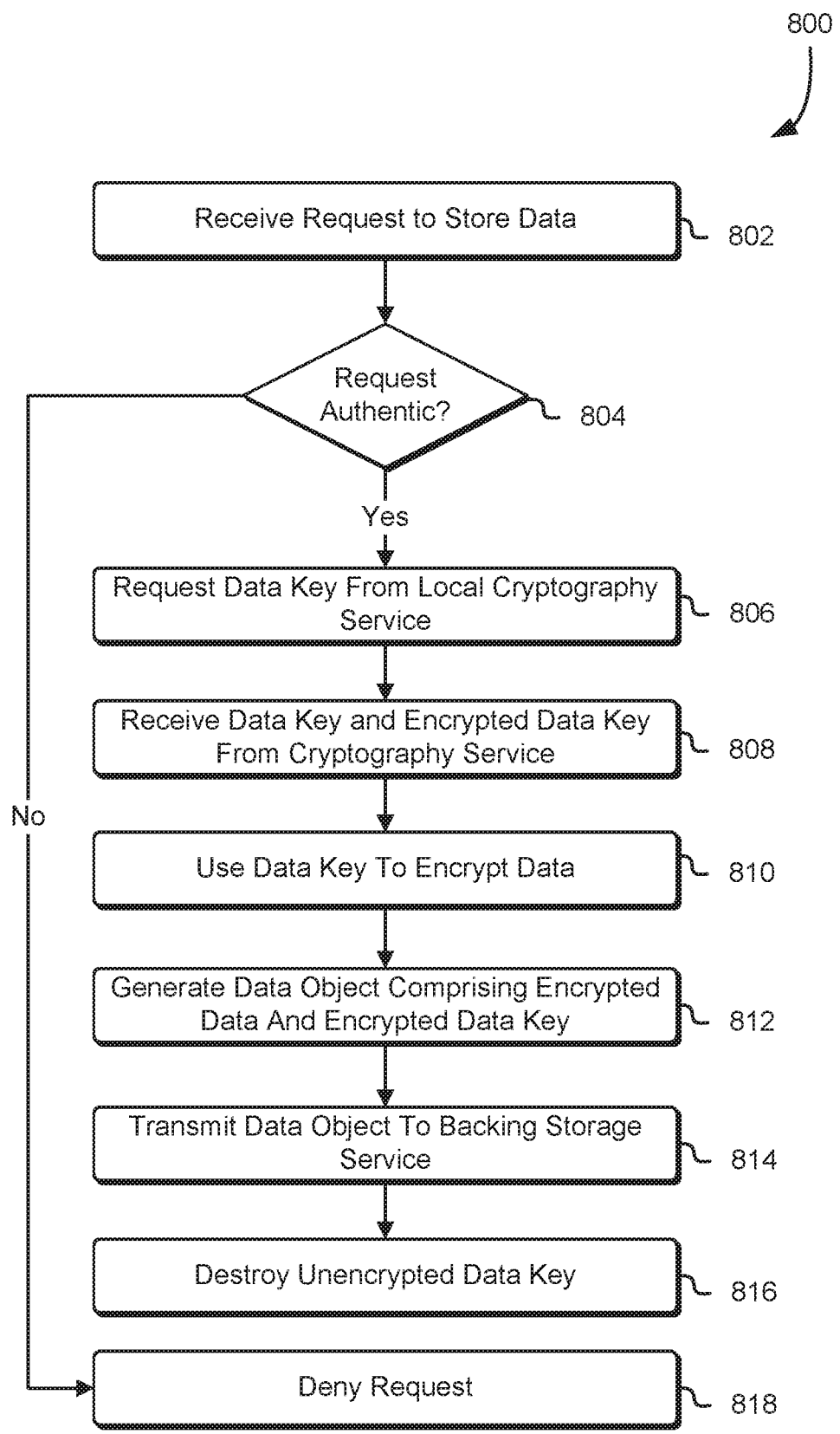
FIG. 8 shows an illustrative example of a process for processing a request to store data in accordance with at least one embodiment.

FIG. 8 shows an illustrative example of a process 800 which may be used to store data in a data storage service. The process 800 may be performed by any suitable system such as a service proxy described above. In an embodiment the process 800 includes receiving 802 a request to store data. The request may be in the form of an appropriately configured API call such as a web service call that includes values for parameters that enable the request to be fulfilled and that enable determination of whether the request should be fulfilled. The request may originate from any suitable computer system such as a customer computer system such as described above. Upon receipt 802 of the request, a determination may be made 804 whether the request is authentic. The determination 804 whether the request is authentic may be made in any suitable way such as described above in connection with the processes 600 and 700 described in connection with FIGS. 6 and 7, respectively. For example, a service proxy may communicate with an authentication service in order to receive a decision from the authentication service whether the request is authentic. As with the processes described above, additional operations such as checks whether fulfillment of the request is in compliance with policy may also be performed.

If it is determined 804 that the request is authentic and/or generally that the request should be fulfilled, the process 800 may include requesting 806 a data key from a local cryptography service. The local cryptography service may be a cryptography service such as described above that is in the same zone as the system performing the process 800. For instance, referring to FIG. 3, the cryptography service may be the cryptography service 312. Referring to FIG. 4, the cryptography service may be the cryptography service 412. It should be noted that, as with all processes described herein, variations are considered as being within the scope of the present disclosure and the cryptography service is not necessarily a local cryptography service but it may be a cryptography service that is in a zone that is different from a zone in which a data storage service in which the data is to be ultimately stored is located. In this manner the cryptography service is not necessarily local but in a zone that is different from the zone where the data will be stored. Further the keys required for accessing the data are stored in a different zone than the encrypted data itself.

As illustrated in FIG. 8 a response to the request for the data key from the local cryptography service may be provided, and an encrypted data key may be received 808 from the cryptography service. The data key may be encrypted by a customer key, which may have been implicitly determined by the cryptography service or which may have been specified in the request to the local cryptography service. The received data key may then be used 810 to encrypt the data. Once the data has been encrypted 810 the process 800 may include generating 812 a data object that comprises the encrypted data and the encrypted data key. The data object that was generated 812 may be transmitted 814 to a backing storage service in another zone. Referring to FIG. 3, for example, the storage service proxy 310 may transmit the data object to the storage service 314 via an appropriately configured API call such as a web service call to the storage service 314. Referring to FIG. 4, the storage service proxy 410 may transmit the data object to the storage service 414 via an appropriately configured API call.

Once the data key is no longer needed by the system performing the process 800, the process 800 may include destroying the unencrypted data key. Destroying 816 the unencrypted data key may be performed in any suitable manner and generally in any manner in which access to the data key is lost by the system performing the process 800. As one example, the data key in unencrypted form may be managed by the system performing the process 800 such that the data key is only stored in volatile memory such as random access memory (RAM) or a central processing unit (CPU) register. In this manner, when power is cut to the volatile memory, the access to the stored unencrypted data key is lost, or if power is never cut the memory locations in which the data key is stored will eventually be overwritten as the system performing the process 800 continues to operate such as by performing the process 800 additional times as future requests are received. As another example, the data key may be destroyed by overriding any memory locations in which the data key is stored, whether volatile or non-volatile memory with other data, which may be a sequence of 0 bits, a sequence of 1 bits, a sequence of random bits, or a sequence of bits that does not contain sensitive information. Generally, any manner of causing a loss of access to the data key may be used. In addition, as noted above, destruction 816 of the unencrypted data key may be performed synchronously in performance of the process 800 and not necessarily as an operation in the order illustrated in FIG. 8, or may be performed asynchronously, such as part of a process that operates to eventually destroy data keys or allow data keys to be overwritten with other data.

Returning to the determination 804 whether the request is authentic, if it is determined 804 that the request is not authentic or otherwise that the request should not be fulfilled, the process 800 may include denying 818 the request such as described above. As with all processes discussed herein, variations are considered as being within the scope of the present disclosure. For example, as illustrated in FIG. 8, a request for a data key is submitted to a cryptography service that generates or otherwise obtains a data key and provides in response the data key in plaintext and cypher text form. As an alternative a system performing the process 800 may generate or obtain a data key itself and provide the data key to the cryptography service for encryption. The cryptography service may then provide the encrypted data key back and not necessarily provide the data key back since the system performing the process 800 may already have access to the data key. Also as noted above, the request to store data that is received is described as being received from a customer computing system such as described above. In various embodiments, the request does not necessarily originate from a customer computer system but may originate from another computer system despite the data ultimately being stored as a service for the customer.

In addition, as another example of a variation, a request to store data may not be received externally from another system. Performance of the process 800 may, for example, include generation of the data, and upon generation of the data and performing operations that result in the data being encrypted and transmitted to a data storage service such as described above. Further, the process 800, as illustrated in FIG. 8, includes generation 812 of a data object that comprises and encrypted data and the encrypted data key. As an example, the encrypted data and encrypted data key may be concatenated together to form the data object. In this manner the encrypted data key and the encrypted data object are persisted together for later access such as described below. However, in various embodiments, the encrypted data key and encrypted data are not necessarily persisted together but may be persisted in different logical data containers of a data storage service in different storage services or in other ways. For instance, the encrypted data key may be stored locally while the encrypted data is transmitted to a storage service in accordance with techniques described above. Metadata maintained may persist an association between the encrypted data key and the data encrypted under the key. Other variations are also considered as being within the scope of the present disclosure.

Figure 9:
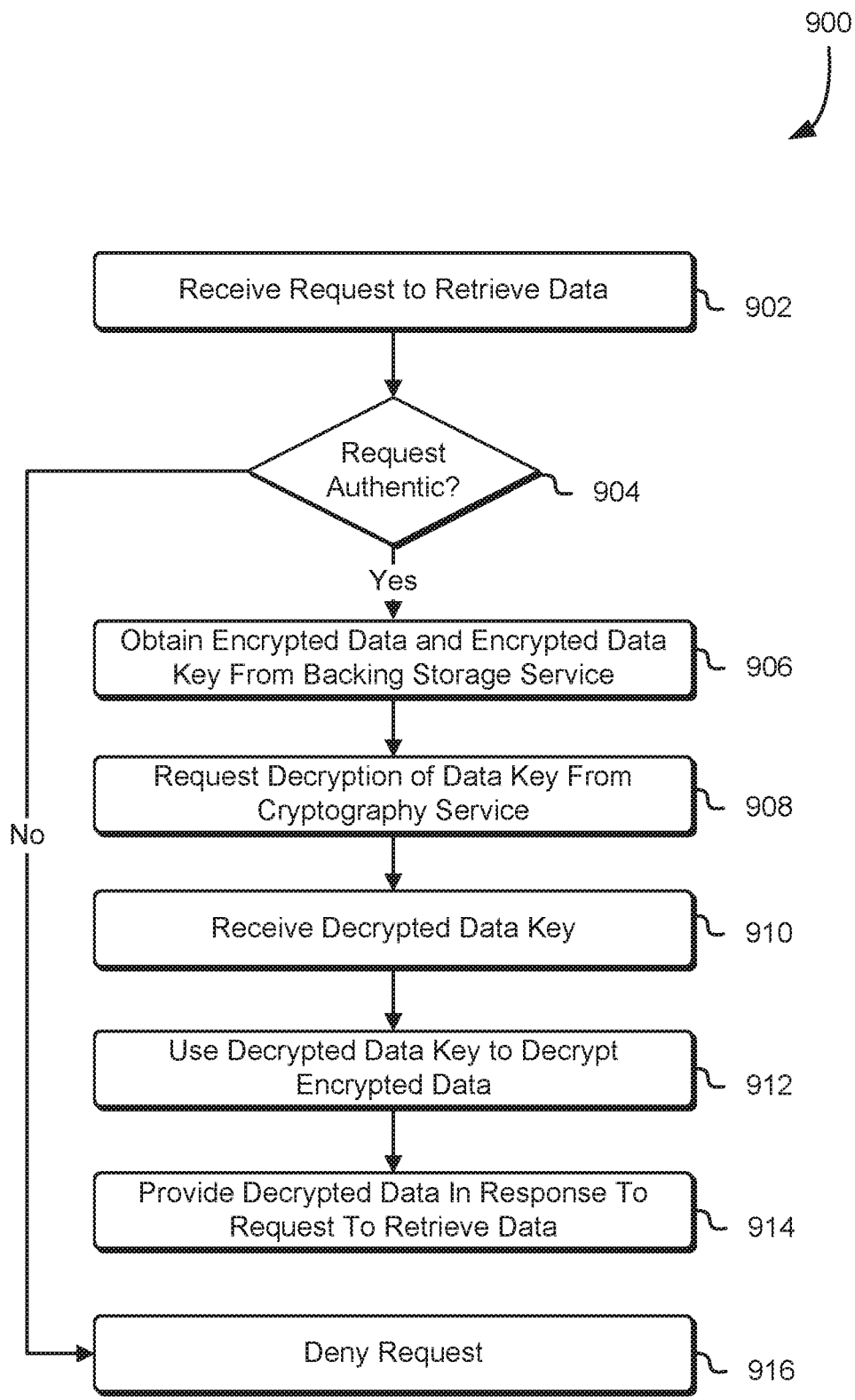
FIG. 9 shows an illustrative example of a process for processing a request to retrieve data in accordance with at least one embodiment.

FIG. 9 illustrates an illustrative example of a process 900 which may be performed to retrieve data from a data storage service where the data may have been stored by the data storage service in accordance with the process 800 described above in connection with FIG. 8. The process 900 may be performed by any suitable system such as by the system that performed the process 800 discussed above in connection with FIG. 8 or by another system, such as another system in a zone that is different from the zone in which the data storage service is located. As illustrated in FIG. 9, the process 900 includes receiving 902 a request to retrieve data, where the request to retrieve data may be in the form of an appropriately configured API call such as described above. A determination may be made 904 whether the request is authentic, such as described above, and if determined 904 that the request is authentic, the process 900 may include obtaining 906 encrypted data and an encrypted data key from a backend storage service. For example, referring to FIG. 3, the storage service proxy 310 may submit a request to the storage service 314 to retrieve a data object that comprises the encrypted data key in the encrypted data. The storage service 314 may provide the data object that comprises the encrypted data and the encrypted data key in response. Referring to FIG. 4, for example, the storage service proxy 410 may submit a request to the storage service 414 for a data object that comprises the encrypted data and the encrypted data key, and the storage service 414 may provide, in response, the data object that comprises the encrypted data and encrypted data key. As noted above, however, the encrypted data and encrypted data key are not necessarily persisted together and performance of the process 900 may include obtaining the encrypted and including the encrypted data key in various ways and in accordance with various embodiments, such as by retrieving the encrypted data from a system that stores the encrypted data and retrieving the encrypted data key from another system that stores the encrypted data key.

Once the encrypted data and encrypted data key have been obtained 906, the process 900 may include requesting 908 decryption of the data key from a cryptography service which may be a local cryptography service such as described above or any suitable cryptography service such as a cryptography service in a zone that is different from a zone the data storage service is located. In response to the request 908 for decryption of the data key from the cryptography service, the decrypted data key may be received 910 from the cryptography service to which the request was submitted. The decrypted data key may then be used to decrypt the encrypted data 912, and the decrypted data may then be provided 914 in response to the request to retrieve the data. Returning to the determination 904 whether the request is authentic, if it is determined 904 that the request is not authentic or otherwise that the request should not be fulfilled, the process 900 may include denying 916 the request. In addition, while not illustrated in the figure, the process 900 may include destroying the unencrypted data key such as described above. The unencrypted data key may be destroyed, for example, in instances where the data is to remain stored by a storage service in encrypted form and therefore in a manner such that unauthorized access to the data key could be problematic.

Figure 10:
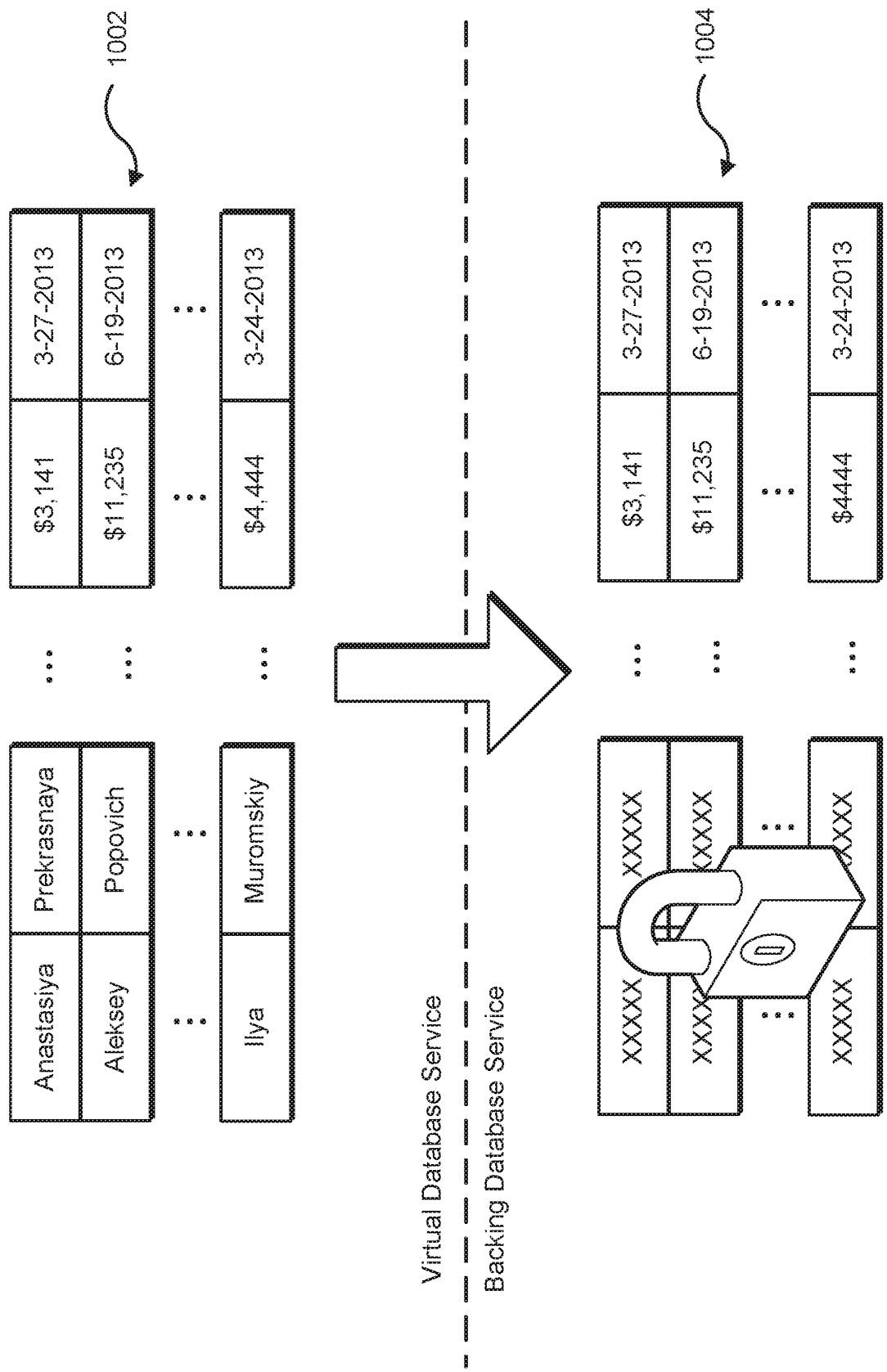
FIG. 10 shows an illustrative example of a database table transformation in accordance with at least one embodiment.

As noted above, the types of services which may utilize the various techniques described herein may vary in accordance with the various embodiments. In some examples, for instance, a service proxy for a database service may be located in one zone where the service proxy services as an API proxy to a database service in another zone. Referring to FIG. 3, for example, the storage service proxy 310 may be a service proxy for a database service which may be the storage service 314. Similarly referring to FIG. 4, the storage service 414 may be a database service to which the storage service proxy 410 acts as an API proxy. As noted above, some, but not all, data sent from a service proxy to a backing service may be encrypted. FIG. 10 accordingly shows an illustrative example of data which may be stored by a database service. In particular, FIG. 10 shows an illustrative diagram of data organized into a relational table 1002 stored by a virtual data base service which may be, for instance, a service proxy such as described above. As illustrated in FIG. 10, the data base table 1002 comprises various data which may be, for instance, data about sales transactions, although the scope of the present disclosure is not limited to the specific types of data mentioned herein. In this particular example, each column of the table 1002 corresponds to a different type of information. The first column shown, for instance, may correspond to first names, the second column may correspond to last names, the third illustrated column may correspond to transaction amounts, and the last column may correspond to dates on which the corresponding transaction occurred. A row in the table 1002 may, for instance, identify the person who made a transaction, the transaction, and the date on which the transaction occurred. As indicated by the ellipses, other information may be included as well, such as an identifier for an item purchased, a payment method (credit card, e.g.) and other types of data. Some of the data in the table 1002 may be considered sensitive. For instance, the first and last name which may be names of customers may be considered sensitive data and may be subject to various privacy laws, rules, regulations, or general preferences. Some of the data may not be considered sensitive such as the amounts of the transactions and the dates of which they occurred.

Accordingly, performance of the various techniques described above may include encrypting some, but not all, of the data in the table 1002 before it is sent to a backing database service. FIG. 10 shows an illustrative example of a table 1004 illustrating how the same data may be organized at the backing database service. In particular, as indicated by the arrow transitioning between the virtual database service and the backing database service, data in the table 1002 transformed, resulting in the table 1004 where the first two columns corresponding to first and last names respectively, and possibly other columns, are encrypted. The values in the tables corresponding to the amounts, however, are left unencrypted. In this manner, as discussed in more detail below, the backing database service may be able to provide at least some functionality with respect to the unencrypted data, such as by processing queries using the unencrypted data. While the encrypted columns of the relational database table are consecutive, the columns that are encrypted are not necessarily consecutive. Further, while FIG. 10 shows illustrative examples of a relational database table, the scope of the present disclosure is not limited to relational databases and related organizations of data sets, but also extends to other types of databases and generally any types of data storage services that store data in a structured manner. Generally, any type of database that is able to process queries may be used in accordance with the various embodiments.

Figure 11:
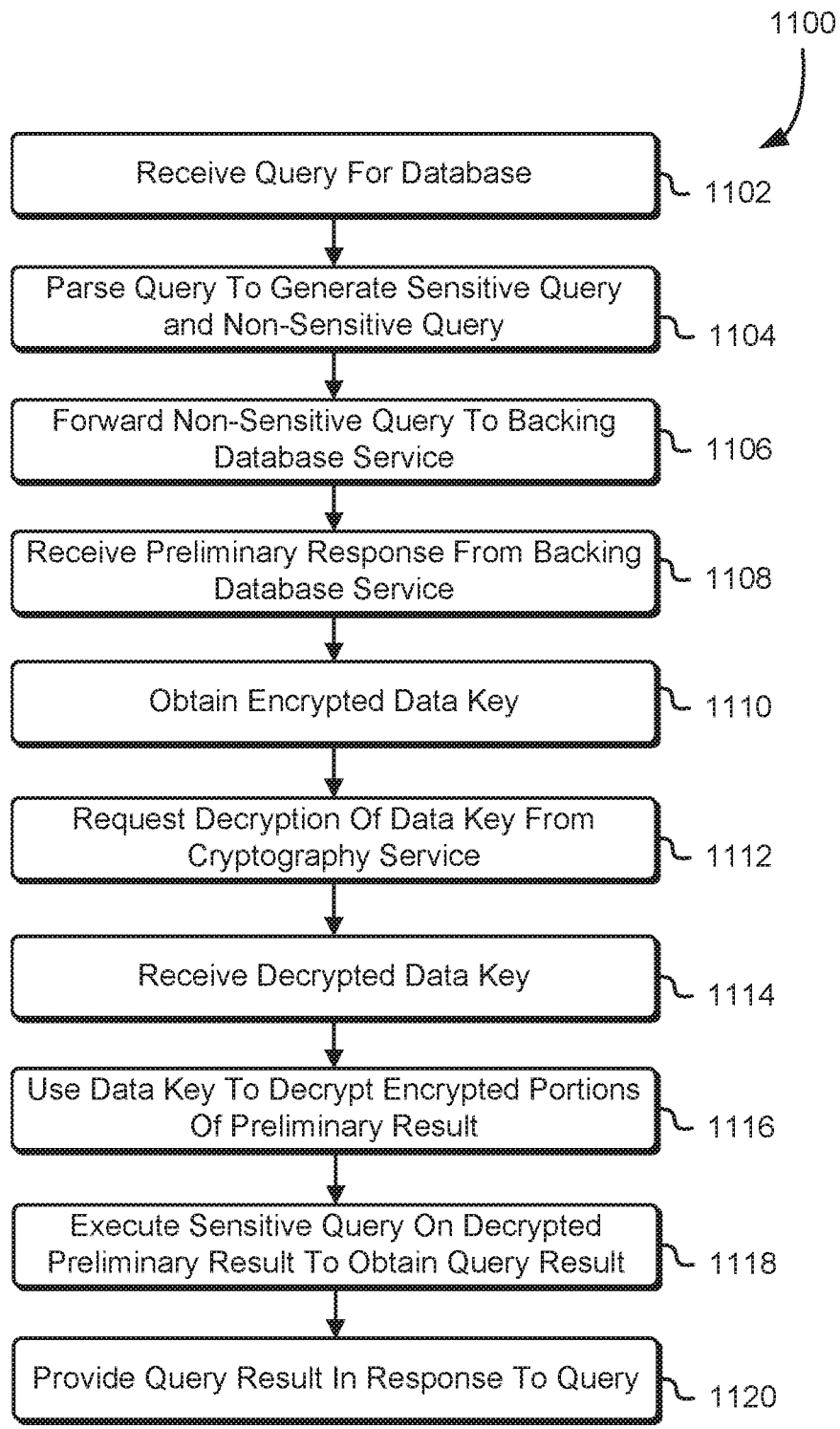
FIG. 11 shows an illustrative example of a process for processing a database query in accordance with at least one embodiment.

When a database of a computing resource provider stores some but not all data that is encrypted, such as in accordance with the techniques described above, processing of database queries may occur across different zones. In other words, some processing may occur in one zone and other processing may occur in other zones. FIG. 11 accordingly shows an illustrative example of a process 1100 which may be used to process a database query. The process 1100 may be performed by any suitable system such as by a service proxy described above. For example, a service proxy may perform the process 1100 in order to process queries that it receives despite the actual data being stored by a backing service in another zone. In an embodiment, the process 1100 includes receiving 1102 a query for a database. The query may be received encoded in an appropriately configured API call to the system performing the process 1100. The query may then be parsed 1104 or otherwise analyzed in order to generate a sensitive query and a non-sensitive query, where the sensitive query and the non-sensitive query are configured such that sequential execution of the non-sensitive query then the sensitive query, with some intermediate data modification on a result of the non-sensitive query as described in more detail below, provides the same result as executing the query.

Parsing the query may be performed in any suitable manner. For example, in some embodiments, columns of a database table are tagged in a manner indicating whether the columns contain sensitive data. Referring to FIG. 10, for example, the first two columns illustrated may be tagged as sensitive where as other columns may be tagged as non-sensitive where tagging as sensitive or non-sensitive may be implicit by the absence of a tag. The tags may enable a storage proxy to determine which data to encrypt before transmitting data to a backing service. The service proxy may, for instance, be configured to receive data through its API interface, identify which columns in a database the data affects, determine which, if any, columns are tagged as sensitive, and encrypt the data for the identified columns before transmitting to the backing service. Parsing the query may be performed by identifying portions of the query that require a search of columns tagged as sensitive, or generally a search of data tagged as sensitive. Similarly, parsing the query may be performed by identifying of the query requiring a search of data tagged as non-sensitive. Turning to the illustrative example of FIG. 10, for instance, a query may be configured to identify data in a relational database that satisfies one or more conditions on a last name as well as one or more conditions on a transaction amount. As noted above, a column for last names may be tagged as sensitive whereas a column of transactions amounts may be tagged as non-sensitive. In this manner, parsing such a query may be performed by extracting from the query a sub-query for identifying data that satisfies the one or more conditions on the transaction amount. Some of the data identified may not satisfy the one or more conditions on the last name. In this manner a sub-query configured to identify data that satisfies the one or more conditions on the last name may be identified as the sensitive query.

Returning to FIG. 11, the non-sensitive query may be forwarded 1106 to a backing database service such as in the form of an appropriately configured API call to the backing database service. The backing database service may receive the non-sensitive query and process the non-sensitive query on a database the backing database services maintains on behalf of a customer for which the query was received 1102. The backing database service may then generate a preliminary response and provide that generated preliminary response which, as noted above, may be over-inclusive as it may include data that does not satisfy the sensitive query that was generated. Accordingly, the process 1100 includes receiving 1108 the preliminary response from the backing database service. The preliminary response may be received, for example, as a response to the API call that was made to the backing database service.

Once the preliminary response was received 1108 from the backing database service, the process 1100 may include obtaining 1110 an encrypted data key. Obtaining 1110 the encrypted data key may be performed in any suitable manner. For example, the encrypted data key may be included with the preliminary response. And as another example, the encrypted data key may be locally stored in another storage service which may be in the same or in a different zone as the zone in which the system performing the process 1100 is located. Once the encrypted data key has been obtained 1110 the process 1100 may include requesting 1112 decryption of the data key from a cryptography service such as described above. The decrypted data key may be, therefore, received 1114 from the cryptography service and the data key may be used 1116 to decrypt encrypted portions of the preliminary result that was received from the backing database service.

It should be noted that encryption, and therefore decryption, may be performed in various ways in accordance with the various embodiments. For example, each entry in a database table that is encrypted may be encrypted separately. In this manner, the data that is returned in the preliminary result is decryptable regardless of whether the preliminary result includes all the data that was encrypted. Further, as noted, a single data key may be used to decrypt all the data that is encrypted in the preliminary result. Accordingly, depending on a cryptographic cypher that is used, each entry in the database that is encrypted may be encrypted using a different initialization vector (nonce). Numerous variations are considered as being within the scope of the present disclosure, such as encrypting each entry with a different data key, encrypting each column with a different data key, and generally performing encryption in various ways.

Returning to FIG. 11, once the data key has been used 1116 to decrypt the encrypted portions of the preliminary result, the process 1100 may include executing 1118 the sensitive query on the decrypted preliminary result to obtain a query result. The query result may then be provided 1120 in response to the query that was received 1102. In this manner, various technical advantages are achieved. For example, as noted above, a service proxy, which also may be referred to as a virtual database service, may include limited infrastructure. A database service, on the other hand, may include much greater infrastructure in order to handle large amounts of data. The virtual database service may, for example, lack the infrastructure that would enable the virtual database service to handle the amounts of data that the backing database service handles. In this manner, the vast infrastructure of the backing database service may be used to perform the initial processing of the non-sensitive query in a zone where some of the data is encrypted for various reasons discussed above. The much more limited infrastructure of the virtual database service may be used to finish processing of the query. In this manner, despite the presence of data considered sensitive, the infrastructure of the database service is able to be utilized.

In addition, while FIG. 11 shows a process where a query is received to a service proxy and the service proxy generates two queries, one for the backing service to execute and the other for the service proxy to execute, the process 1100 may be adapted to operate in different ways. For instance, in some embodiments, the complete query may be forwarded to the backing service which may itself generate two queries and pass at least one to the service proxy with the preliminary result. As another example, the backing service may process the complete query while ignoring any conditions involving subsets of data tagged as sensitive (or ignoring particular conditions, e.g. conditions required to be satisfied). The proxy may also process the whole query on the preliminary result. Other variations, including adaptations for other types of databases, may be used.

As noted above, various embodiments of the present disclosure may utilize numerous zones, numerous service proxies, and numerous backing zones. In some instances, a service proxy may selectively provide data to different backing zones. For example, a storage service may have different advantages in different zones. A data storage service in one zone, for example, may be cheaper than the same or a similar data storage service in another zone. As another example, a data storage service in one zone may be better for latency reasons than the same or similar data storage service in another zone. Despite the advantages of one zone over another, as noted above, various concerns may result in a requirement or preference that data be stored in one zone or another zone. Different jurisdictions may have different regulations regarding various types of data, for instance. Thus, in order to achieve some advantages and/or generally comply with various regulations, some data may be stored in one zone and other data may be stored in another zone in order to comply with various requirements and/or preferences.

Figure 12:
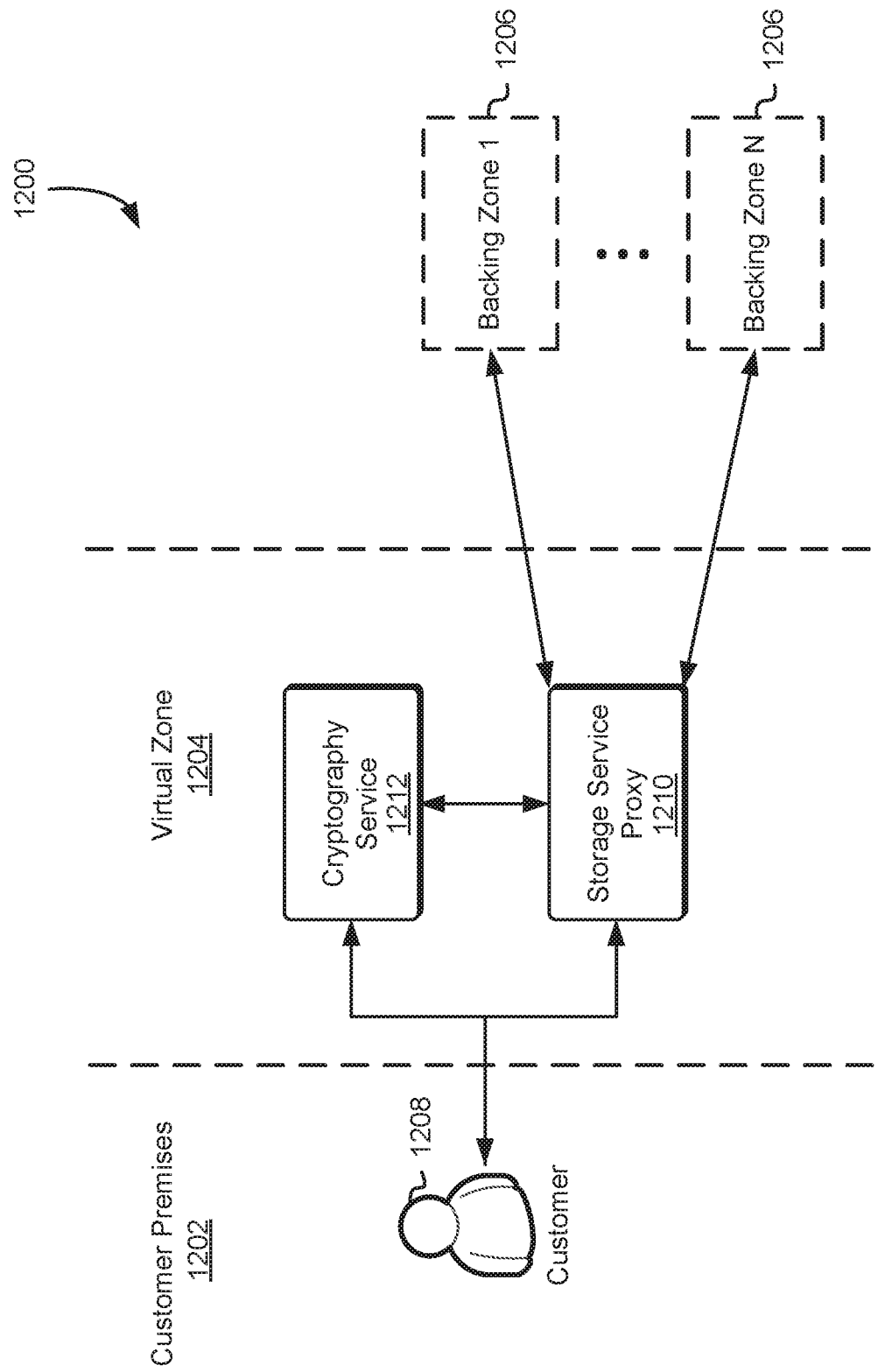
FIG. 12 shows an illustrative example of an environment in which various embodiments may be practiced.

Accordingly, a storage service proxy (or proxy for another service) may actively make decisions where to store data based at least in part on various factors. For example, some customers may request through an account configuration or as a parameter in an API call, that their data be stored in a particular zone. As another example, some types of data may be stored for the same customer in one zone while other types of data may be stored in another zone due to varying regulatory requirements. As yet another example, a customer may configure computing resources of a computing resource service provider so that the service proxy applies one or more DLP policies so that some data is sent to one zone and other data is sent to another zone. FIG. 12 accordingly shows an illustrative example of an environment 1200 in which various embodiments that utilize selection from multiple zones may be practiced.

As illustrated in FIG. 12, the environment 1200 includes customer premises 1202, a virtual zone 1204, and one or more backing zones 1206. In this particular example, FIG. 12 illustrates n backing zones where n is a positive integer. It should be noted that while the virtual zone 1204 relative to the customer premises 1202 are illustrated as with FIG. 3, variations such as those shown in FIG. 4 are considered as being within the scope of the present disclosure. As illustrated in FIG. 12, a customer 1208 submits requests and receives responses from a storage service proxy 1210 or other service proxy and a photography service 1212. Each of the backing zones 1206 may include a backing service and an authentication service such as described above, although such services are not illustrated in FIG. 12 for the purpose of simplification. In an embodiment, the customer 1208 submits requests to the storage service proxy 1210 which then may select and submit corresponding requests to one of the backing zones 1206 as appropriate. Appropriateness may be determined in accordance with DLP policy, customer preferences, account configuration, API call parameters and the like.

Figure 13:
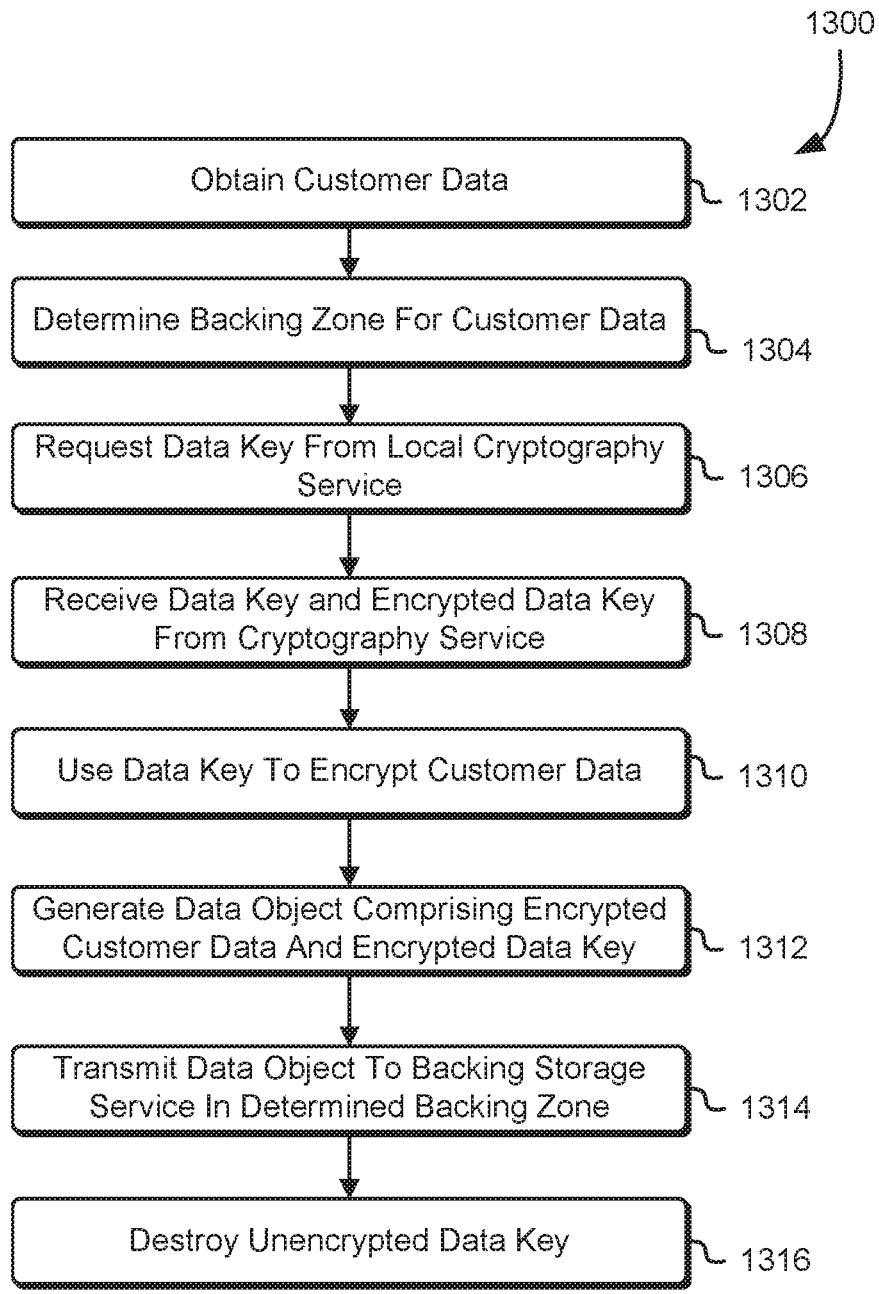
FIG. 13 shows an illustrative example of a process for storing customer data in accordance with at least one embodiment.

FIG. 13 shows an illustrative example of a process 1300 which may be used to utilize various backing services, such as illustrated in FIG. 12, in accordance with various embodiments. As illustrated in FIG. 13, the process 1300 includes obtaining 1302 customer data. Customer data may be obtained, for example, from the customer's computer systems themselves or from other computer systems on behalf of the customer, such as when the customer utilizes a computer resource service provider to provide a service to various members of the public or generally to other customers of the customer. When the customer data is obtained 1302 the process 1300 may include determining 1304 a backing zone for the customer data. Determining 1304 the backing zone can be performed in various ways in accordance with variance embodiments. For example, as noted above, account configuration for a customer may indicate which backing zone is to be used. As another example, the nature of the data itself may be used to determine which backing zone to use. For instance, if data is organized according to a schema, the data's location according to the schema may be used to determine which backing zone to use. As yet another example, a source (network address, user identity, political jurisdiction, etc.) of the customer data may be used to determine the backing zone. Generally, any way in which a backing zone may be determined may be used.

Upon determining 1304, the backing zone for the customer data the process 1300 may include requesting 1306 a data key from a local cryptography service such as described above, or generally from another suitable cryptography service such as described above. Accordingly, a data key and encrypted data key may be received 1308 from the cryptography service to which the request for the data key was submitted. The data key may then be used 1310 to encrypt the customer data and a data object comprising the encrypted customer data and the encrypted data key may be generated 1312. The data object may then be transmitted 1314 to a backing storage service in the determined backing zone. The unencrypted data key may then be destroyed 1316 such as described above.

Figure 14:
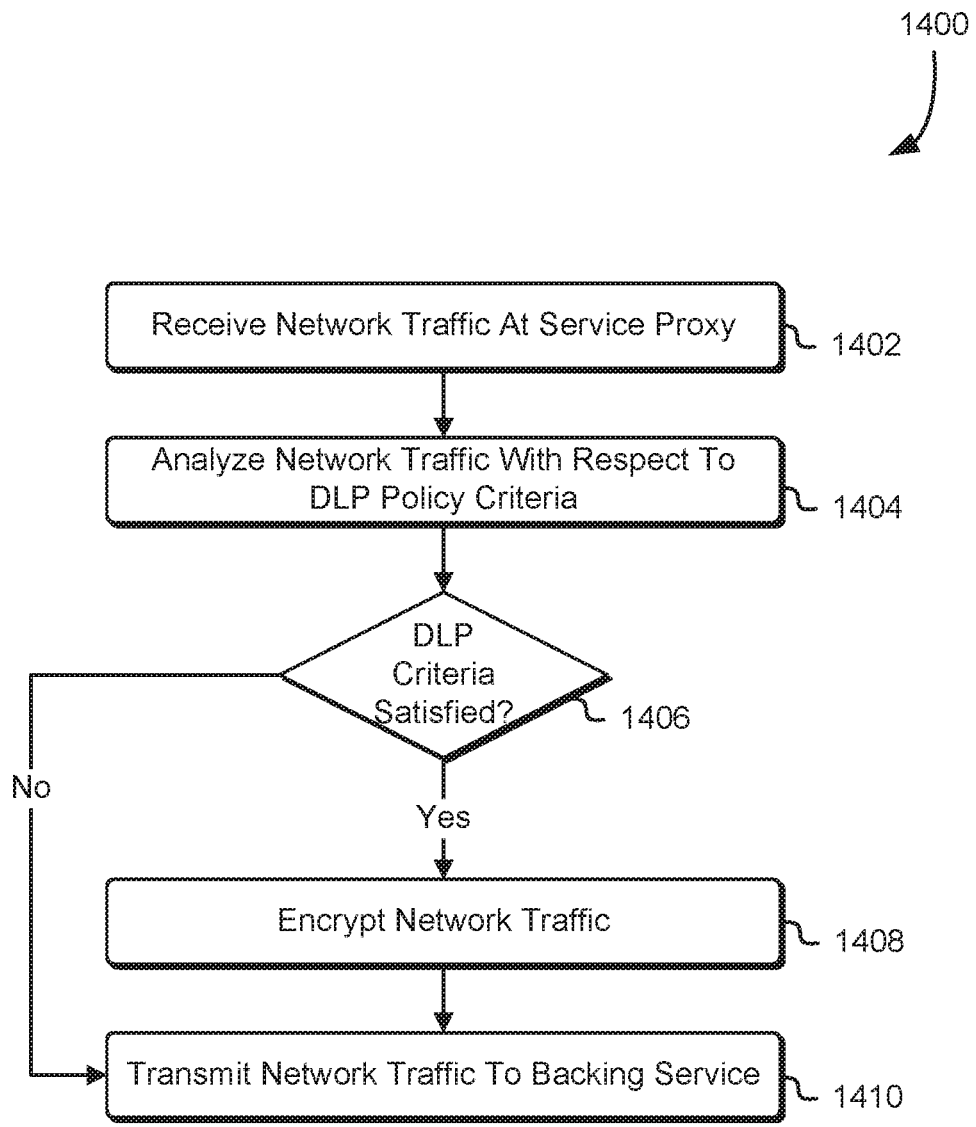
FIG. 14 shows an illustrative example of a process for applying one or more data loss prevention techniques in accordance with at least one embodiment.

It should be noted that variations of the process 1300 are considered as being within the scope of the present disclosure including variations of the various processes described above for transmitting data to a backing service. FIG. 14 shows an illustrative example of a process 1400 for selectively encrypting data and providing the data to a backing service in accordance with an embodiment. In particular, the process 1400 utilizes various data loss prevention techniques such as those described in U.S. Pat. No. 8,416,709 which is incorporated herein by reference. The process 1400 of FIG. 14 may be performed by any suitable system, such as by a service proxy such as described above. The traffic may include, for example, one or more data packets such as IP or transmission control protocol (TCP) packets, handshake requests, such as a portion of the three part TCP handshake or an SSL handshake, or other appropriate data packets. The network traffic may be received from a customer such as described above or another entity associated with the customer such as described above. In some embodiments, the traffic is received 1402 through an application programming interface (e.g., web service interface) of a system performing the process 1400. The network traffic may be analyzed 1404 with respect to one or more DLP policy criteria. DLP policy criteria may include those discussed in U.S. Pat. No. 8,416,709, noted above. For example, data in IP or TCP packets may be inspected for data of certain data types, such as credit card numbers, social security numbers, and/or any other types of data that may be considered sensitive or otherwise for which modification is desired.

A determination may be made 1406 whether the DLP's criteria are satisfied. If it is determined 1406 that the DLP criteria are satisfied, the process 1400 may include encrypting 1408 the network traffic that was received, and transmitting 1410 the network to the backing service. If, however, it is determined 1406 that the DLP criteria are not satisfied, then the network traffic may be transmitted 1410 to the backing service without being encrypted.

As discussed above, various variations are considered as being within the scope of the present disclosure, including decrypting some but not all of the data when DLP criteria are satisfied. In addition, additional actions may be taken in addition to or as an alternative to encryption of the data. Sample actions include, but are not limited to snapshotting, i.e., copying, the network traffic that was received and persisting the snapshot in a data storage service such as the backing service or another data storage service performing packet tracing, performing a quarantine of the network traffic that was received, initiating enhanced logging of network traffic, and/or denial of the action. Generally, any type of action configured to address DLP concerns may be used. In addition, the actions that are taken when a DLP or other policy criteria are satisfied may be configurable by a customer. Generally, data may be manipulated in accordance with customer specifications utilizing techniques such as those described in U.S. patent application Ser. No. 13/491,403, filed on Jun. 7, 2012, entitled "FLEXIBLY CONFIGURABLE DATA MODIFICATION SERVICES," which is incorporated herein by reference.

In particular, a customer may specify certain rules by which various types of data, inbound and/or outbound from customer devices or other devices, may be modified, upon which various components of the distributed computing system are utilized to implement the rules, e.g., using packet mangling techniques. For example, the customer may specify that data through a service proxy to specific external device types or locales must conform to a customer-provided specification (e.g., for regulatory compliance and/or performance optimization), upon which the distributed computing system determines the necessary alterations and data patterns (or other markers) to which they apply. Thereafter, in the example given, the implementation may include redirection of some or all of the network traffic between the customer and the external device in question to a component of the distributed computing system, such as a backing service. Upon processing in the determined manner, the redirected data may be relayed to the original destination. As will be contemplated, a similar process may be utilized for inbound network traffic.

In another example, the data alteration service may be effective to modify data transiting, through the service proxy, between two virtualized instances of the distributed computing system, one of which is controlled by a customer requesting the service, while the other is controlled by a different customer. A separate virtualized instance of the distributed computing system implemented in the service proxy may be invoked to implement the customer-requested rules, or in some embodiments, the same instance from whence (or to which) the data desired to be modified may perform the actual modification, e.g., in a quarantine or "sandbox." It is contemplated that data transiting to or from any device or component controlled by a service-requesting customer, whether physical, virtual, aggregated or otherwise, to a device not under control by the customer (without regard to its nature), may be subject to packet mangling by the service. The service may, in some embodiments, be granularly controllable based on a number of criteria, including customer or external device type, geographic location, and the like.

An example implementation of such a data alteration service may include the generation of one or more policies that apply to some or all components involved in a given data transaction type. The policies, in some embodiments, are generated by the distributed computing system upon receipt of customer-defined rules, and may take into account data type, connected device type, customer characteristics, network topology, or any other characteristics relevant to the generation of an effective policy. Such policies, when broadcasted to the relevant devices, can ensure that all controlled devices (or a desired subset thereof) act to implement the associated customer-defined rules in a unified, predictable fashion. In embodiments where a customer controls a significant plurality of devices at varying levels of abstraction and/or access, such policies may also ensure that, e.g., mission-critical or strict rules take effect across all affected devices.

Further, additional operations may be performed in connection with the process 1400. For example, the analysis 1404 of the network traffic may inform the performance of one or more other operations. In some embodiments, for instance, a cryptographic key may be determined based at least in part on the analysis. Some types of data may, for example, may require (e.g., in accordance with one or more regulations and/or preferences) stronger encryption than other types of data. If the analysis finds one type of data, the data may be encrypted using a key that is smaller than another type of data that could be determined by the analysis. A first type of data, for instance, may require encryption using a 128-bit key whereas another type of data may require encryption using a 256-bit key. The key, accordingly, may be determined (e.g., generated or obtained from data storage) based on the analysis.

Figure 15:
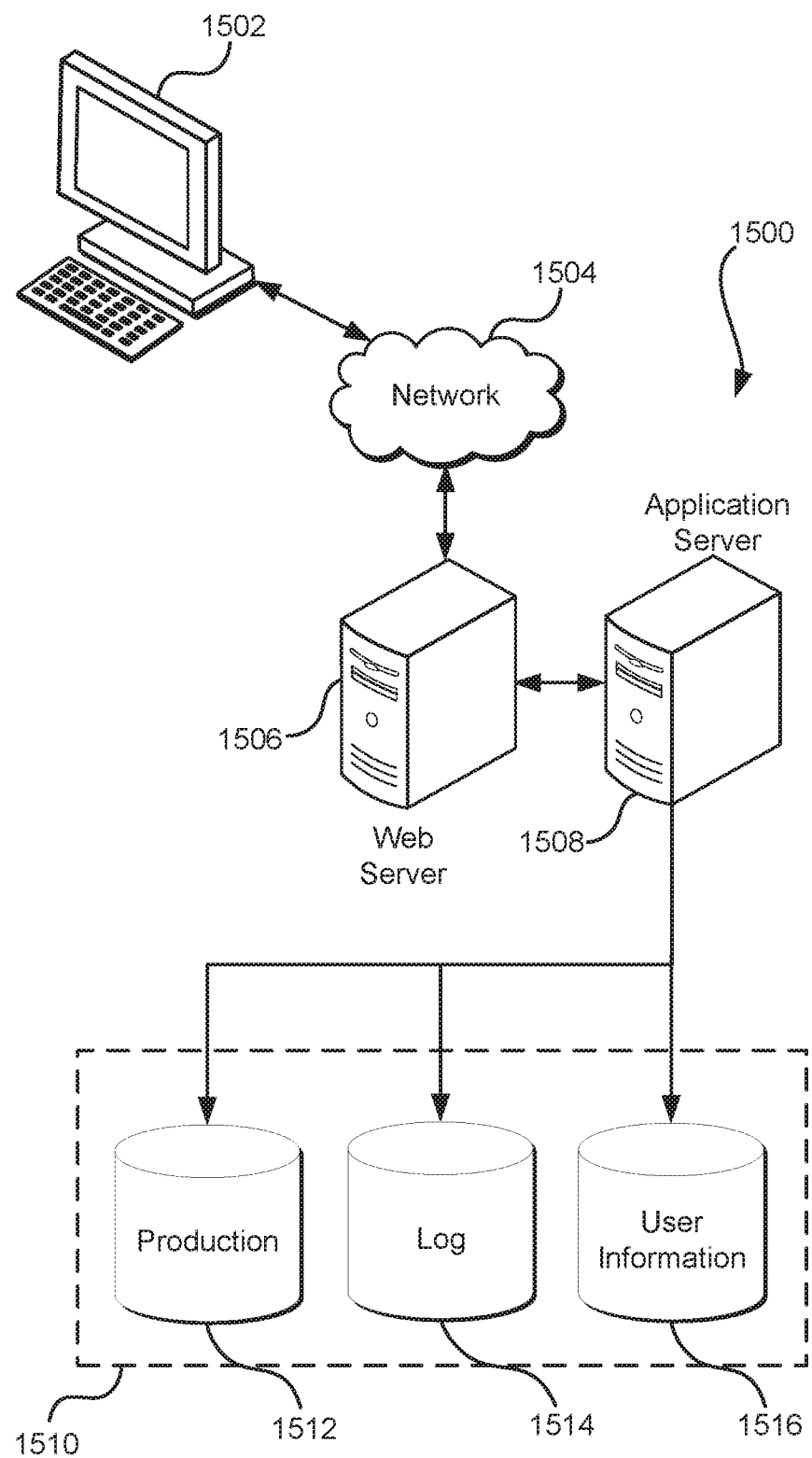
FIG. 15 illustrates an environment in which various embodiments can be implemented.

FIG. 15 illustrates aspects of an system 1500 for implementing aspects in accordance with various embodiments. As will be appreciated, although a web-based environment is used for purposes of explanation, different environments may be used, as appropriate, to implement various embodiments. The environment includes an client device 1502, which can include any appropriate device operable to send and receive requests, messages or information over an appropriate network 1504 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1506 for receiving requests and serving content in response thereto, although for other networks an alternative device serving a similar purpose could be used as would be apparent to one of ordinary skill in the art.

The illustrative environment includes at least one application server 1508 and a data store 1510. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1502 and the application server 1508, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1510 can include several separate data tables, databases or other data storage mechanisms and media for storing data relating to a particular aspect of the present disclosure. For example, the data store illustrated may include mechanisms for storing production data 1512 and user information 1516, which can be used to serve content for the production side. The data store also is shown to include a mechanism for storing log data 1514, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1502. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising a first data storage service comprising a first web service interface, the first web service interface operating as a proxy to the first data storage service by at least:
    obtaining, in connection with a first request from one or more computing devices, the request submitted to the first web service interface to store data;
    analyzing the data to make a determination whether the data satisfies at least one criterion of a data loss prevention policy comprising a plurality of criteria, at least one of the plurality of criteria identifying a data format corresponding to data determined to be sensitive; and
    processing the first request in accordance with the determination, the determination indicating that the data satisfies the at least one criterion, by at least:
        using a key maintained inaccessible to a second data storage service to encrypt the data to produce, at least in part, a data object comprising the data encrypted by the key and an encrypted version of the key, the key selected from a plurality of keys that provide different levels of encryption strength for encrypted data at least based on the analysis of the data and at least one requirement of the data loss prevention policy, the at least one requirement identifying a data type and the key, and the second data storage service:
            including a second web service interface that receives web service requests transmitted to the second data storage service; and
            operating to process, using a plurality of data storage devices, the web service requests transmitted to the second web service interface; and
        transmitting the data object to the second data storage service by submitting a second request to the first web service interface.

2. The system of claim 1, wherein the data loss prevention policy is configurable via the first web service interface.

3. The system of claim 1, the first web service interface has at least one public Internet protocol address.

4. The system of claim 1, further comprising a cryptography service that maintains the key in a political jurisdiction outside of another legal jurisdiction in which the first data storage service is located.

5. The system of claim 4, wherein the cryptography service utilizes a hardware security module that manages cryptographic keys on behalf of a customer.

6. The system of claim 1, wherein the second data storage service further operates to:
obtain, at the second web service interface, a third request to retrieve the data; and
process the third request by at least:
obtaining the data object from the first data storage service by submitting a fourth request to the first web service interface;
decrypt the encrypted key associated with the data object to obtain the key;
using the key to decrypt the encrypted data to produce decrypted data; and
providing the decrypted data.

7. The system of claim 1, wherein analyzing the data identifies the data has a data type and to make a determination whether the data, based on the data type, satisfies the at least one criterion of the data loss prevention policy.

8. A computer-implemented method, comprising:
obtaining, at a first service provided by at least one computing device, data associated with a storage request;
determining that the data satisfies at least one criterion of a data loss prevention policy comprising a plurality of criteria, at least one of the plurality of criteria identifying a data format corresponding to data determined to be sensitive;
based on determining the data satisfies the at least one criterion, obtaining a key that is inaccessible to a second service and an encrypted version of the key, the key selected from a plurality of keys that provide different levels of encryption strength for encrypted data, and the key selected from the plurality of keys based on at least analysis of the data and at least one requirement of the data loss prevention policy;
encrypting, using the key that is inaccessible to the second service, the data to produce encrypted data; and
providing the encrypted data and the encrypted key to the second service.

9. The computer-implemented method of claim 8, wherein obtaining the data includes receiving the storage request at a web service interface that operates as a proxy to the first service.

10. The computer-implemented method of claim 9, wherein a zone in which the first service operates is associated with the data loss prevention policy.

11. The computer-implemented method of claim 8, wherein the second service includes a web service interface that receives web service requests transmitted to the second service.

12. The computer-implemented method of claim 8, wherein providing the encrypted data to the second service includes transmitting the encrypted data to the second service by submitting a second request to a web service interface.

13. The computer-implemented method of claim 8, further comprising obtaining a request to retrieve the data from the second service.

14. The computer-implemented method of claim 8, wherein the key is selected at least based on a requirement of the data loss prevention policy.

* * * * *